United States Patent [19]

Nouso

[11] Patent Number: 5,233,417
[45] Date of Patent: Aug. 3, 1993

[54] IMAGE MOVEMENT DETECTING APPARATUS

[75] Inventor: Kazunori Nouso, Kanagawa, Japan

[73] Assignee: Nissan Motor Co., Ltd., Yokohama, Japan

[21] Appl. No.: 707,148

[22] Filed: May 31, 1991

[30] Foreign Application Priority Data

Jun. 1, 1990 [JP] Japan .................................. 2-141270
Jul. 13, 1990 [JP] Japan .................................. 2-184311
Jul. 13, 1990 [JP] Japan .................................. 2-184312

[51] Int. Cl.⁵ .......................... H04N 7/18; H04N 7/12
[52] U.S. Cl. ...................................... 358/105; 358/135
[58] Field of Search ...................... 358/105, 135, 136; 364/919.2

[56] References Cited

U.S. PATENT DOCUMENTS 5,111,410 5/1992 Nakayama et al. ................. 358/105

Primary Examiner—John K. Peng
Attorney, Agent, or Firm—Lowe, Price, LeBlanc & Becker

[57] ABSTRACT

An image movement detecting apparatus for use with a television camera. An image is inputted from the television camera at intervals of time. The image is scanned in a series of scan lines to detect a pixel in each of the scan lines, the detected pixel forming an edge point in the image. The image processing apparatus calculates values each of which indicates a distance between detected pixels forming the same edge point in new and last images inputted successively. The calculated values are averaged to calculate a movement of the new image with respect to the last image. The calculated movement is added to a movement of the last image with respect to a reference image having no influence of movement of the television camera to calculate a total movement of the new image with respect to the reference image.

38 Claims, 19 Drawing Sheets

FIG.12.1
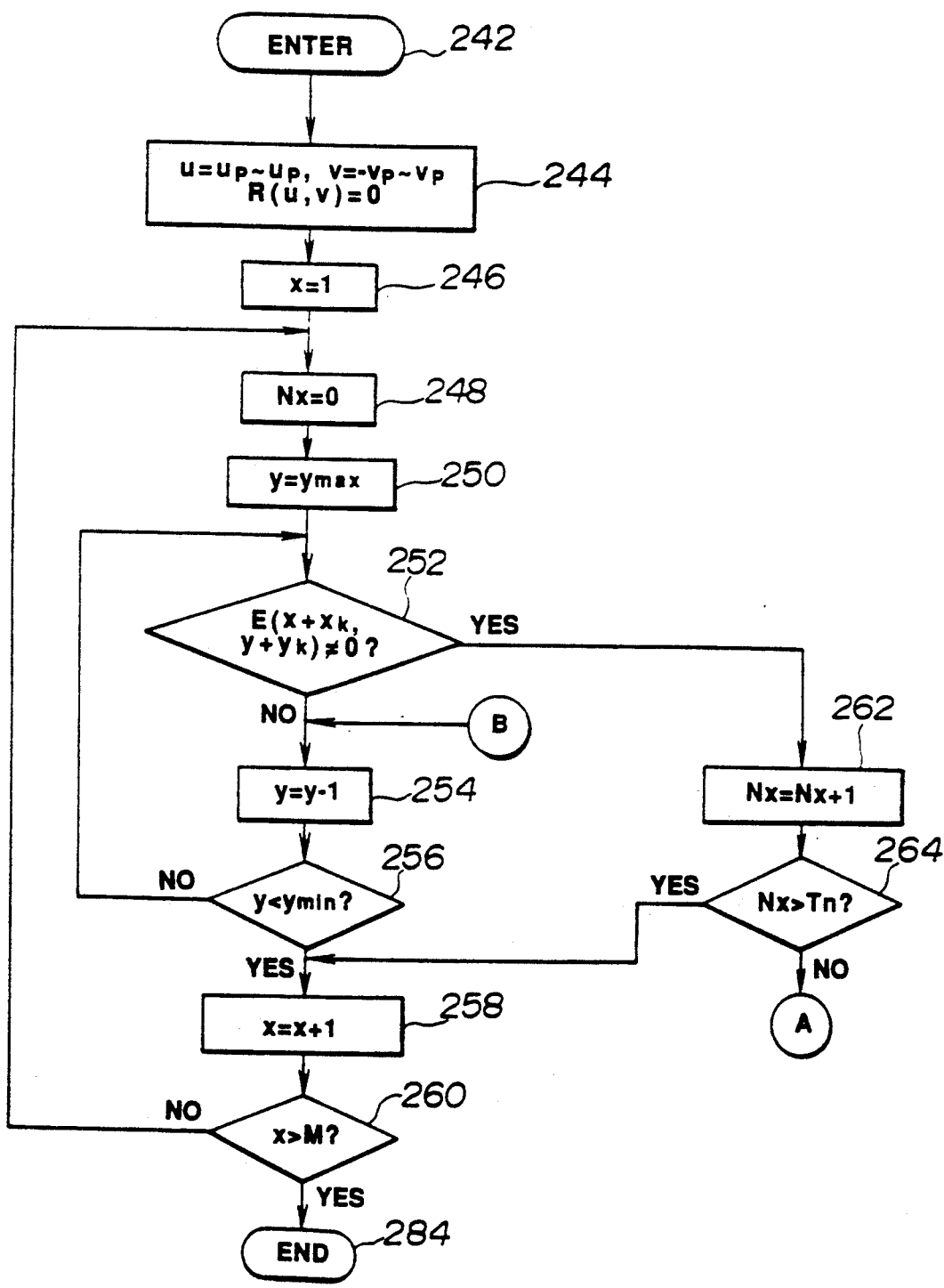

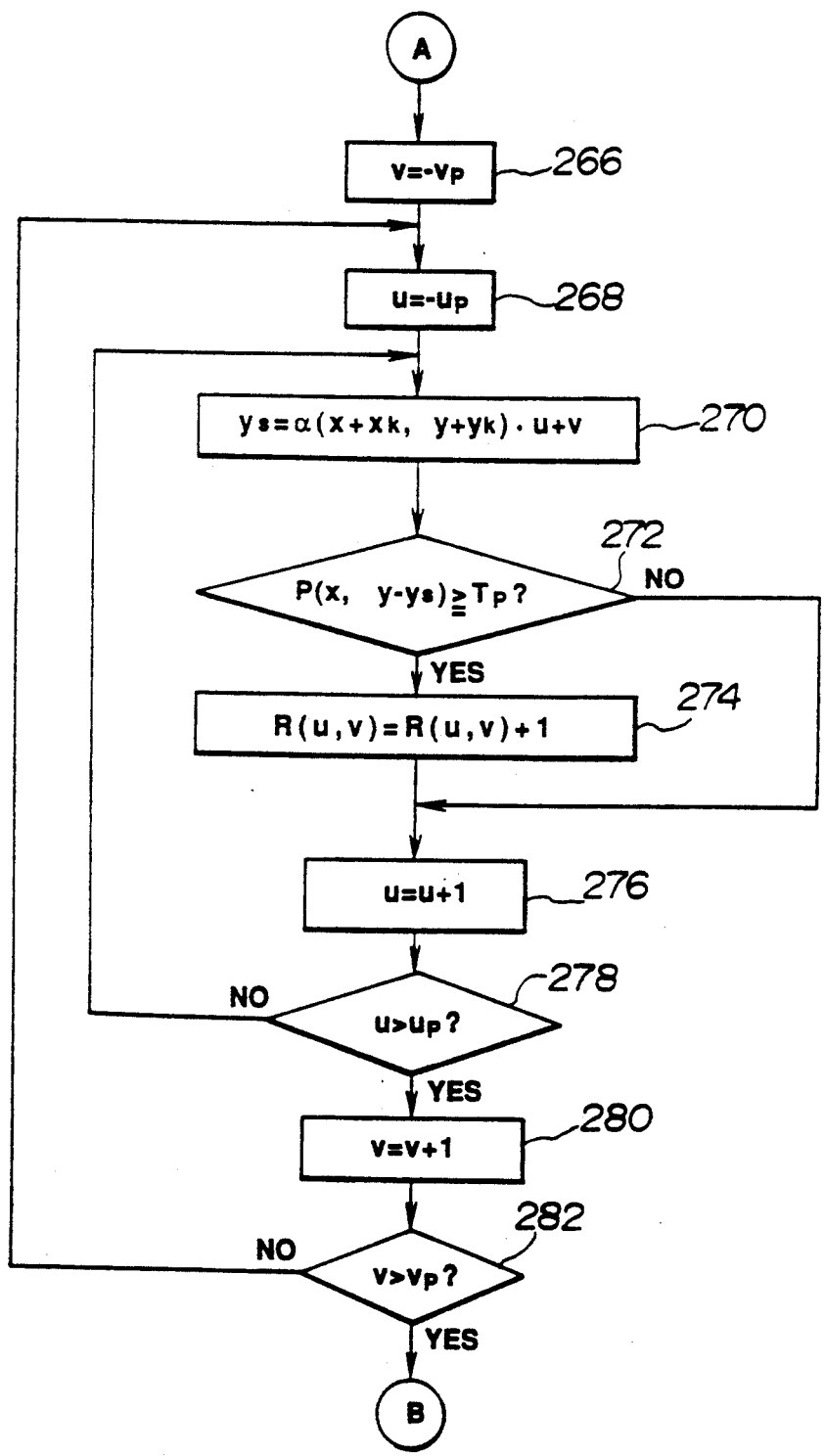
FIG.12.2

5,233,417

IMAGE MOVEMENT DETECTING APPARATUS

BACKGROUND OF THE INVENTION

This invention relates to an image processing apparatus and, more particularly, to an image movement detecting apparatus for use with a television camera.

When a television camera is installed on a moving object such as an automotive vehicle, an airplane, a helicopter or the like, the image inputted from the television camera contains horizontal and/or vertical moving components. It is, therefore, required to process the inputted image to cancel the influence of movement of the television camera.

FIG. 1 is a schematic illustration of a prior art image correcting apparatus for use with a television camera including a lens 1, a mirror 2, a CCD 3 and a transducer 4. The light travels through the lens 1 and reflects on the mirror 2 to form an image on the CCD 3. The transducer 4 converts the image formed on the CCD 3 into a video signal for application to an image processing unit. The television camera also includes an electric motor 5, a G sensor 6 and a motor control unit 7. The G sensor is located to detect the vertical or pitching movement of the television camera. The motor control unit 7 receives the information from the G sensor to control the electric motor 5 so as to rotate the mirror 2 at an angle corresponding to the detected camera pitching movement in a direction canceling the influence of movement of the television camera on the image.

A serious problem associated with such a conventional apparatus is lack of durability since the image movement correction is made through a mechanical system including the mirror 2 and the motor 5. Moreover, the conventional apparatus requires troublesome adjustments for a constant used in matching the output of the G sensor 6 to the unit angle of rotation of the mirror 5.

SUMMARY OF THE INVENTION

Therefore, it is a main object of the invention to provide an image movement detecting apparatus which can detect image movements with high accuracy.

There is provided, in accordance with the invention, an image movement detecting apparatus for use with a television camera. The apparatus comprises means for inputting an image from the television camera at intervals of time, means for scanning the image in a series of scan lines to detect a pixel in each of the scan lines, the detected pixel forming an edge point in the image, means for calculating values each of which indicates a distance between detected pixels forming the same edge point in new and last images inputted successively, means for averaging the calculated values to calculate a movement of the new image with respect to the last image, and means for adding the calculated movement to a movement of the last image with respect to a reference image having no influence of movement of the television camera to calculate a total movement of the new image with respect to the reference image.

In another aspect of the invention, the image movement detecting apparatus comprises means for inputting an image from the television camera at intervals of time, means for scanning the image in a series of vertical scan lines to detect a pixel in each of the vertical scan lines, the detected pixel forming an edge point in the image, means for calculating values each of which indicates a vertical distance between first and second pixels forming the same edge point in new and last images inputted successively, the first and second pixels being detected in one of the vertical scan lines, means for averaging the calculated values to calculate a vertical movement of the new image with respect to the last image, and means for adding the calculated vertical movement to a vertical movement of the last image with respect to a reference image having no influence of movement of the television camera to calculate a total vertical movement of the new image with respect to the reference image.

In another aspect of the invention, the image movement detecting apparatus comprises means for inputting an image from the television camera at intervals of time, means for scanning the image in a series of horizontal scan lines to detect a pixel in each of the horizontal scan lines, the detected pixel forming an edge point in the image, means for calculating values each of which indicates a horizontal distance between first and second pixels forming the same edge point in new and last images inputted successively, the first and second pixels being detected in one of the horizontal scan lines, means for averaging the calculated values to calculate a horizontal movement of the new image with respect to the last image, and means for adding the calculated horizontal movement to a horizontal movement of the last image with respect to a reference image having no influence of movement of the television camera to calculate a total horizontal movement of the new image with respect to the reference image.

In another aspect of the invention, the image movement detecting apparatus comprises means for inputting an image from the television camera at intervals of time, the inputted image being represented by an array of pixels with each pixel $A(x,y)$ having a value indicating its intensity, means for converting the inputted image into an array of values each $E(x,y)$ of which has a value of 0 or 1 indicating that the corresponding pixel $A(x,y)$ is an edge point forming an edge in the inputted image and a value indicating a gradient of the edge at the edge point, means for assuming a predetermined number of sets of distance values u and v for horizontal and vertical distances uk and vk between pixels representing a point in last and new images inputted successively, means for storing an array of values each $P(x,y)$ of which is incremented when the corresponding pixel $A(x+xk,y+yk)$ is an edge point where xk and ky are horizontal and vertical movements of the last image with respect to a reference image having no influence of movement of the television camera, means for producing a histogram storing an array of values each $R(u,v)$ of which is incremented when the value $P(x,y-ys)$ for a pixel spaced a vertical distance ys away from each $A(x+xk,y+yk)$ of the edge points is greater than a predetermined value for the corresponding one of the sets of distance values u and v, the vertical distance ys being calculated as $ys = \alpha \cdot u + v$ where $\alpha$ is the gradient of the edge at the edge point $E(x+xk,y+yk)$, means for detecting a greatest one of the values stored in the histogram and the corresponding one of the sets of distance values u and v, means for setting the detected distance values u and v for the horizontal and vertical distances uk and vk, and means for calculating total horizontal and vertical movements of the new image with respect to the reference image as $xk+uk$ and $yk+vk$, respectively.

In another aspect of the invention, the image movement detecting apparatus comprises means for inputting an image from the television camera at intervals of time, the inputted image being represented by an array of pixels with each pixel A(x,y) having a value indicating its intensity, means for converting the inputted image into an array of values each E(x,y) of which has a value of 0 or 1 indicating that the corresponding pixel A(x,y) is an edge point forming an edge in the inputted image and a value indicating a gradient of the edge at the edge point, means for assuming a predetermined number of values v for a vertical distance vk between pixels representing a point in last and new images inputted successively, means for storing an array of values each P(x,y) of which is incremented when the corresponding pixel A(x,y+yk) is an edge point where ky is a vertical movement of the last image with respect to a reference image having no influence of movement of the television camera, means for producing a histogram storing an array of values each R(v) of which is incremented when the value P(x,y−v) for a pixel spaced a vertical distance v away from each A(x,y+yk) of the edge points is greater than a predetermined value for the corresponding one of the velocity values v, means for detecting a greatest one of the values stored in the histogram and the corresponding one of the distance values v, means for setting the detected distance value v for the vertical distance vk, and means for calculating a total vertical movement of the new image with respect to the reference image as yk+vk.

In another aspect of the invention, the image movement detecting apparatus comprises means for inputting an image from the television camera at intervals of time, the inputted image being represented by an array of pixels with each pixel A(x,y) having a value indicating its intensity, means for converting the inputted image into an array of values each E(x,y) of which has a value of 0 or 1 indicating that the corresponding pixel A(x,y) is an edge point forming an edge in the inputted image and a value $\alpha(x,y)$ indicating a gradient of the edge at the edge point, means for assuming a predetermined number of sets of distance values u and v for horizontal and vertical distances uk and vk between pixels representing a point in last and new images inputted successively, means for storing an array of values each P(x,y) of which is incremented when the corresponding pixel A(x+xk,y+yk) is an edge point where xk and ky are horizontal and vertical movements of the last image with respect to a reference image having no influence of movement of the television camera, means for assuming a predetermined number of distance values yp for a vertical distance ys, means for producing a first histogram storing an array of values each S(r,s) of which being stored in connection with a gradient value r and a distance value s, the each value S(r,s) being incremented with the corresponding gradient value r being set at $\alpha(x+xk,y+yk).G$ where G is a constant and the corresponding distance value s being set at a distance value yp assumed for the vertical distance ys when the value P(x,y−yp) for a pixel spaced a vertical distance ys equal to the assumed value yp away from each A(x+xk,y+yk) of the edge points is greater than a predetermined value, means for producing a second histogram storing an array of values each R(u,v) of which is incremented by $$\sum_{r} S(r, u \cdot r/G + v)$$

means for detecting a greatest one of the values stored in the second histogram and the corresponding one of the sets of distance values u and v, means for setting the detected distance values u and v for the horizontal and vertical distances uk and vk, and means for calculating total horizontal and vertical movements of the new image with respect to the reference image as xk+uk and yk+vk, respectively.

In still another aspect of the invention, the image movement detecting apparatus comprises means for inputting an image from the television camera at intervals of time, the inputted image being represented by an array of pixels with each pixel A(x,y) having a value indicating its intensity, means for converting the inputted image into an array of values each E(x,y) of which has a value of 0 or 1 indicating that the corresponding pixel A(x,y) is an edge point forming an edge in the inputted image and a value $\alpha(x,y)$ indicating a gradient of the edge at the edge point, means for assuming a predetermined number of distance values v for a vertical distance vk between pixels representing a point in last and new images inputted successively, means for storing an array of values each P(x,y) of which is incremented when the corresponding pixel A(x,y+yk) is an edge point where ky is a vertical movement of the last image with respect to a reference image having no influence of movement of the television camera, means for assuming a predetermined number of distance values yp for a vertical distance ys, means for producing a first histogram storing an array of values each S(r,s) of which being stored in connection with a gradient value r and a distance value s, the each value S(r,s) being incremented with the corresponding gradient value r being set at $\alpha(x,y+yk).G$ where G is a constant and the corresponding distance value s being set at a distance value yp assumed for the vertical distance ys when the value P(x,y−yp) for a pixel spaced a vertical distance ys equal to the assumed value yp away from each A(x,y+yk) of the edge points is greater than a predetermined value, means for producing a second histogram storing an array of values each R(v) of which is incremented by $$\sum_{r} S(r, v)$$

means for detecting a greatest one of the values stored in the second histogram and the corresponding one of the distance values v, means for setting the detected distance value v for the vertical distance vk, and means for calculating a total vertical movements of the new image with respect to the reference image as yk+vk.

BRIEF DESCRIPTION OF THE DRAWINGS

This invention will be described in greater detail by reference to the following description taken in connection with the accompanying drawings, in which:

FIGS. 12.1 and 12.2 are flow diagrams of the programming of the digital computer as it is used to produce a velocity histogram;

DETAILED DESCRIPTION OF THE INVENTION

Figure 1:
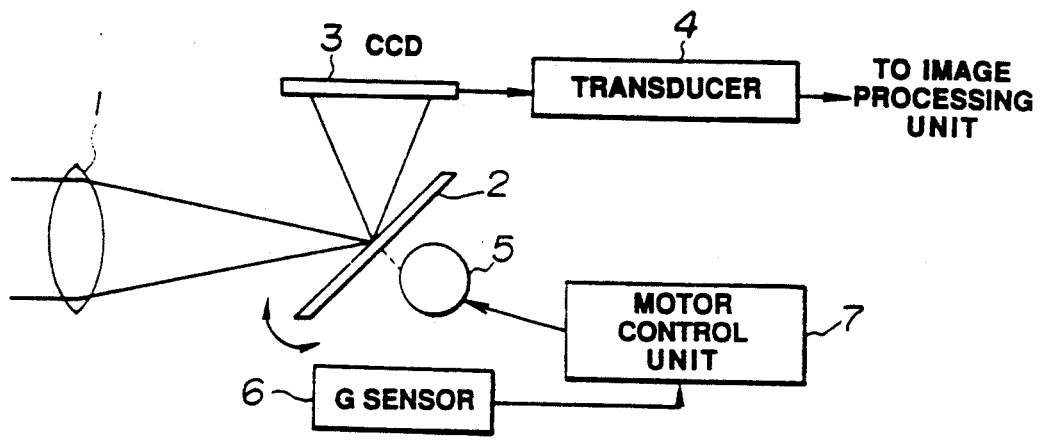
FIG. 1 is a schematic diagram of a prior art image movement correcting apparatus.
Figure 2:
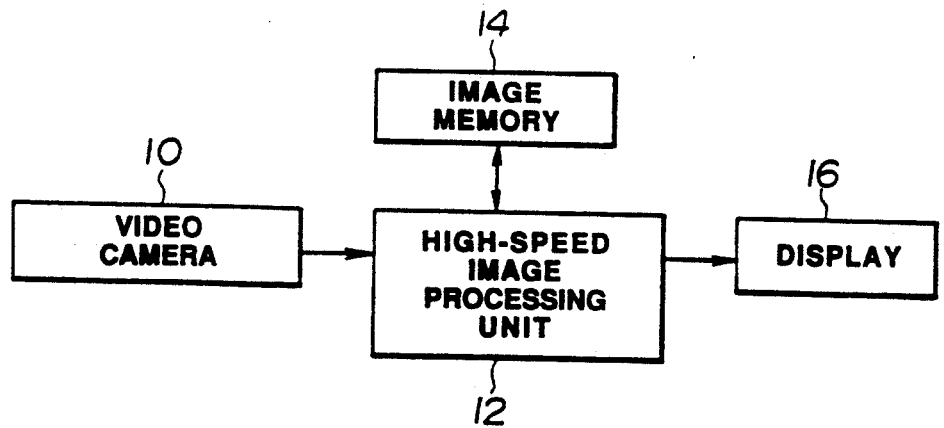
FIG. 2 is a schematic diagram showing one embodiment of an image movement detecting apparatus made in accordance with the invention.

With reference to the drawings, and in particular to FIG. 2, there is shown an image processing apparatus embodying the invention. The image processing apparatus comprises a television or video camera 10, a high-speed image processing unit 12, an image memory 14, and a display unit 16. The television camera 10 is mounted on a moving object such as a vehicle, an airplane, a helicopter or the like. The image processing unit 12 receives a video signal from the video camera 10 and digitally stores the inputted image in the image memory 14 at intervals of time. The stored image A is represented by an M×N array of pixels. Each pixel A(x,y) is assigned a value representative of its intensity (darkness). The image processing unit 12 scans the inputted image A in a series of raster scan lines to convert it into an image B represented by an array of points. Each point B(x,y) has a value of 0 or 1. B(x,y)=1 represents an edge point forming an edge in the inputted image.

The converted image B is scanned from bottom-to-top in a series of scan lines to detect a pixel forming an edge point in each of the scan lines. The processing unit 12 calculates values each of which indicates a distance between the detected pixels forming the same edge point in new and last images inputted successively. The values calculated for all of the scan lines are averaged to calculate a movement of the new image with respect to the last image. The calculated movement is added to a movement of the last image with respect to an image having no influence of movement of the television camera 10 to calculate a total movement of the new image with respect to the image having no influence of movement of the television camera 10. The calculated total movement is a vertical movement of the new image with respect to the image having no influence of movement of the television camera 10 when the converted image B is scanned in a series of vertical scan lines. Similarly, the calculated total movement is a horizontal movement of the new image with respect to the image having no influence of movement of the television camera 10 when the converted image B is scanned in a series of horizontal scan lines.

The calculated total movement is used to correct the new image so as to cancel the influence of vertical or horizontal movement of the television camera 10. The corrected image is displayed on the CRT 16. If the television camera 10 is fixed to a moving object, such as an automotive vehicle, an airplane, a helicopter or the like, the calculated total movement will correspond to a vertical or horizontal movement of the moving object. Thus, the calculated total movement can be utilized to correct a vertical or horizontal posture of the moving object.

The image processing unit 12 employs a digital computer including a central processing unit, a read only memory, a random access memory and an input/output control unit. The read only memory contains the program for operating the central processing unit.

Figure 3:
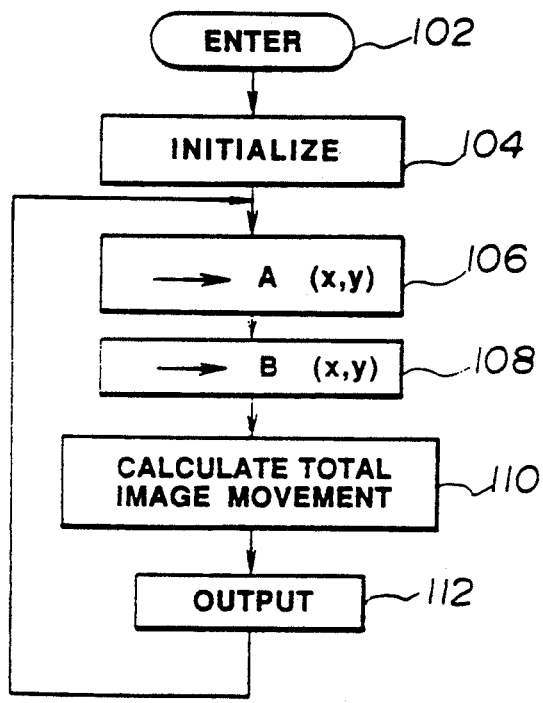
FIG. 3 is an overall flow diagram of the programming of the digital computer used in the image movement detecting apparatus of FIG. 2.

FIG. 3 is an overall flow diagram of the programming of the digital computer used in the image processing unit 12. The computer program is entered at the point 102. At the point 104 in the program, specified memory sections are initialized as will be described in detail. At the point 106 in the program, the image is inputted from the television camera 10 into the image memory 14. The stored image is represented by a 256×240 array of pixels. At the point 108 in the program, the inputted image is converted into an image B. This conversion is made by processing the inputted image A to detects edge points having an intensity (brightness) distinct from the adjacent points. The edge points forms edges in the inputted image A. Each point B(x,y) of the converted image B is represented as $$B(x,y) = |A(x-1, y-1) + 2A(x, y-1) + A(x+1, y-1) - A(x-1, y+1) - 2A(x, y+1) - A(x+1, y+1)|$$

The inputted and converted images A and B are stored in different memory sections of the image memory 14. The converted image B is used to detect a vertical and/or horizontal movement of the inputted image with respect to an image having no influence of movement of the television camera 10. The inputted image A is corrected based upon the detected vertical and/or horizontal movement. It is to be noted that the steps at the point 106 and 108 may be made simultaneously.

At the point 110 in the program, the converted image B is scanned from bottom-to-top and left-to-right in a series of vertical scan lines arranged every a predetermined number Xp of pixels to detect a pixel forming an edge point in each of the vertical scan lines. The central processing unit calculates values each of which indicates a distance between the detected pixels forming the same edge point in new and last images inputted successively. The values calculated for all of the vertical scan lines are averaged to calculate a vertical movement of the new image with respect to the last image. The calculated vertical movement is added to a movement of the last image with respect to an image having no influence of vertical or pitching movement of the television camera 10 to calculate a total vertical movement of the new image with respect to the image having no influence of vertical movement of the television camera 10. At the point 112 in the program, the inputted image A is corrected or shifted in vertical direction by an amount corresponding to the calculated total vertical movement so as to cancel the influence of pitching movement of the television camera 10. The corrected image is displayed on the CRT 16. Following this, the program is returned to the point 106.

Figure 4:
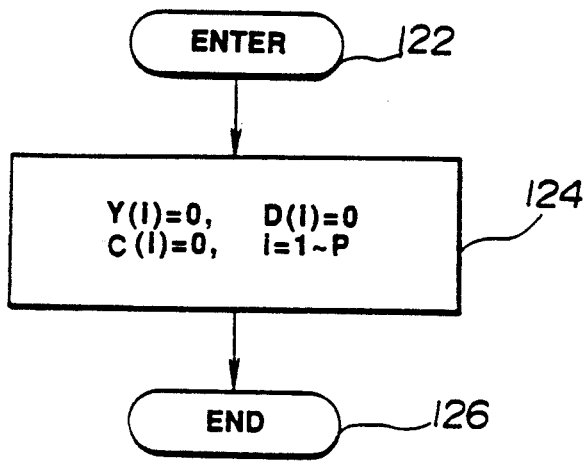
FIG. 4 is a flow diagram of the programming of the digital computer as it is used to initialize values stored in the memory sections.

FIG. 4 is a flow diagram of the programming of the digital computer as it is used to initialize the memory sections. The computer program is entered at the point 122 which corresponds to the point 104 of FIG. 3. At the point 124 in the program, the values stored in the memory sections assigned to Y(i), D(i) and C(i) where i=1, 2, ..., p) are cleared to zero. The character p indicates the number of the vertical scan lines in which the converted image B is scanned and may be an integer in a range of 32 to 256. The program then proceeds to the end point 126 which corresponds to the point 106 of FIG. 3.

Figure 5:
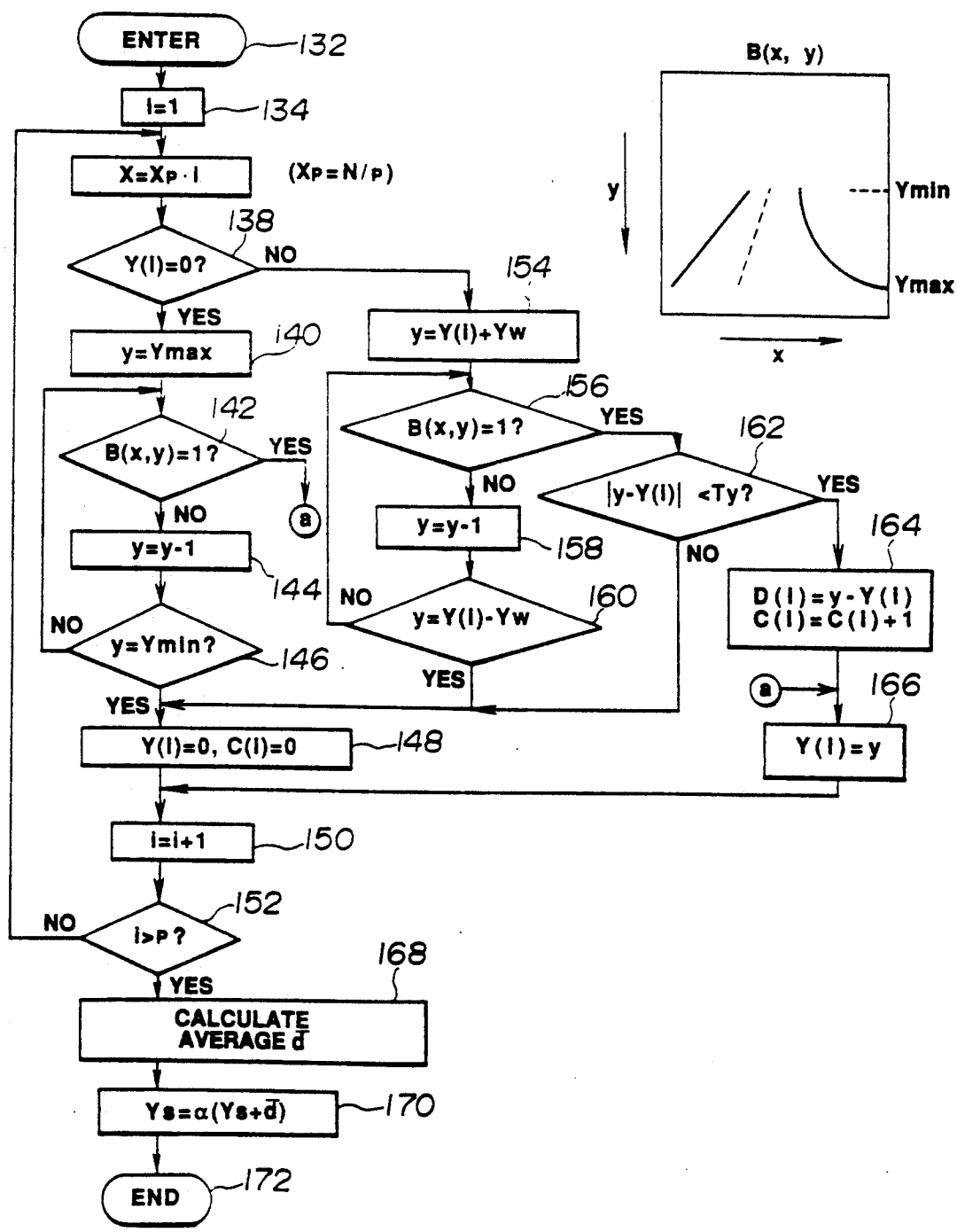
FIG. 5 is a flow diagram of the programming of the digital computer as it is used to measuring the movement of an image with respect to a reference image having no influence of movement of the television camera.

FIG. 5 is a flow diagram of the programming of the digital computer as it is used to detect the total vertical or pitching movement of an inputted image with respect to an image having no influence of pitching movement of the television camera 10. At the point 132, which corresponds to the point 110 of FIG. 3, the computer program is entered. At the point 134 in the program, the i counter is reset to its initial value of 1. At the point 136 in the program, the x counter is reset to its initial value Xp·i (Xp=N/p). The character N is the number of the pixels arranged in the y or vertical direction.

At the point 138 in the program, a determination is made as to whether or not the value stored in the memory section Y(i) is zero. If the answer to this question is "yes", then it means that the last image A, which was inputted in the last cycle of execution of the program, has no edge point in the existing vertical scan line (x=Xp·i) and the program proceeds to the point 140 where the y counter is reset to its maximum value ymax (for example, 240). Following this, the program proceeds to a determination step at the point 142. This determination is as to whether or not the existing point B(x,y), which is represented by the coordinates (x,y) corresponding to the x and y counters, is an edge point in the new image which was inputted in this cycle of execution of the program. If the answer to the question is "yes", then the program proceeds to the point 166. Otherwise, the program proceeds to the point 144 where the y counter is decremented by one step. The program then proceeds to a determination step at the point 146 where the count of the y counter is equal to its minimum value Ymin. If the answer to this question is "yes", then it means that all of the points arranged in the existing vertical scan line (x=Xp·i) have been searched and the program proceeds to the point 148 where the values stored in the memory sections Y(i) and C(i) are cleared to zero. Otherwise, the program is returned to the point 142.

At the point 150 in the program, the i counter is incremented by one step. The program then proceeds to a determination step at the point 152. This determination is as to whether or not the count of the i counter is greater than the value p. If the answer to this question is "yes", then it means that all of the points of the converted image B have been searched and the program proceeds to the point 168. Otherwise, the program is returned to the point 136.

If the answer to the question inputted at the point 138 is "no", then it means that the last image has an edge point in the existing vertical scan line (x=Xp·i) and the program proceeds to the point 154 where the y counter is set to y=Y(i)+Yw where Yw is a predetermined value. The program then proceeds to a determination step at the point 156. This determination is as to whether or not the existing point B(x,y), which is represented by the coordinates (x,y) corresponding to the x and y counters, is an edge point. If the answer to the question is "no", then second occurrence the program proceeds to the point 158 where the y counter is decremented by one step. The program then proceeds to a determination stop at the point 160. This determination is made as to whether or not the count of the y counter is equal to Y(i)−Yw. If the answer to this question is "yes", then it mean that the new image A has no edge point in the existing vertical scan line (x=Xp·i) over a range of y=Y(i)+Yw to y=Y(i)−Yw and the program proceeds to the point 148. Otherwise, the program is returned to the point 156.

If the answer to the question inputted at the point 156 is "yes", then it means that the new image A has an edge point in the existing vertical scan line (x=xp·i) and the program proceeds to another determination step at the point 162. This determination is as to whether or not the absolute value |y−Y(i)| is less than a predetermined value Ty. The absolute value |y−Y(i)| indicates a vertical distance between the edge point detected in the vertical scan line (x=Xp·i) for the new image A and the edge point detected in the same vertical scan line (x=Xp·i) for the last image. If the answer to this question is "yes", then it means that these edge points are considered to represent the same point; that is, the distance corresponds to the pitching movement of the new image A with respect to the last image and the program proceeds to the point 164. Otherwise, it means that these edge points are considered to form different points in the new and last images and the program proceeds to the point 148.

At the point 164 in the program, a distance value indicating the distance y−Y(i) is stored in the memory section D(i) and the number C(i)+1 of the edge points detected in the same vertical scan line (x=Xp·i) for successive inputted images is stored in the memory section C(i). The program then proceeds to the point 166 where the existing count of the y counter; that is, the y coordinate of the detected edge point, is stored in the memory section Y(i) for a comparison made in the next cycle of execution of the program. Following this, the program proceeds to the point 150.

At the point 168 in the program, an average $\bar{d}$ is calculated for D(i) as $$\bar{d} = \frac{1}{Q} \sum_{i=1}^{\ell} D(i)$$

where i the integers which satisfy a condition C(i)>Tc where Tc is a predetermined value (for example, 5) and Q is the number of the distance values D(i) used in this calculation. The calculated average d indicates the vertical movement of the new image A with respect to the last image.

At the point 170 in the program, the last integrated value Ys is updated by $\alpha(Ys+\bar{d})$ where $\alpha$ is a value (for example, 0.95) which is nearly equal to 1 and less than 1. In such a manner, the calculated average value $\bar{d}$ is integrated each time an image is inputted. After this step is repeated, the integrated value Ys indicates the vertical movement of the new image A with respect to an image having no influence of pitching movement of the television camera 10. It is, therefore, possible to eliminate the influence of pitching movement of the television camera 10 by correcting or shifting the new image A in the vertical direction by an amount equal to the integrated value Ys. Following this, the program proceeds to the end point 172 which corresponds to the point 112 of FIG. 3.

Figure 6:
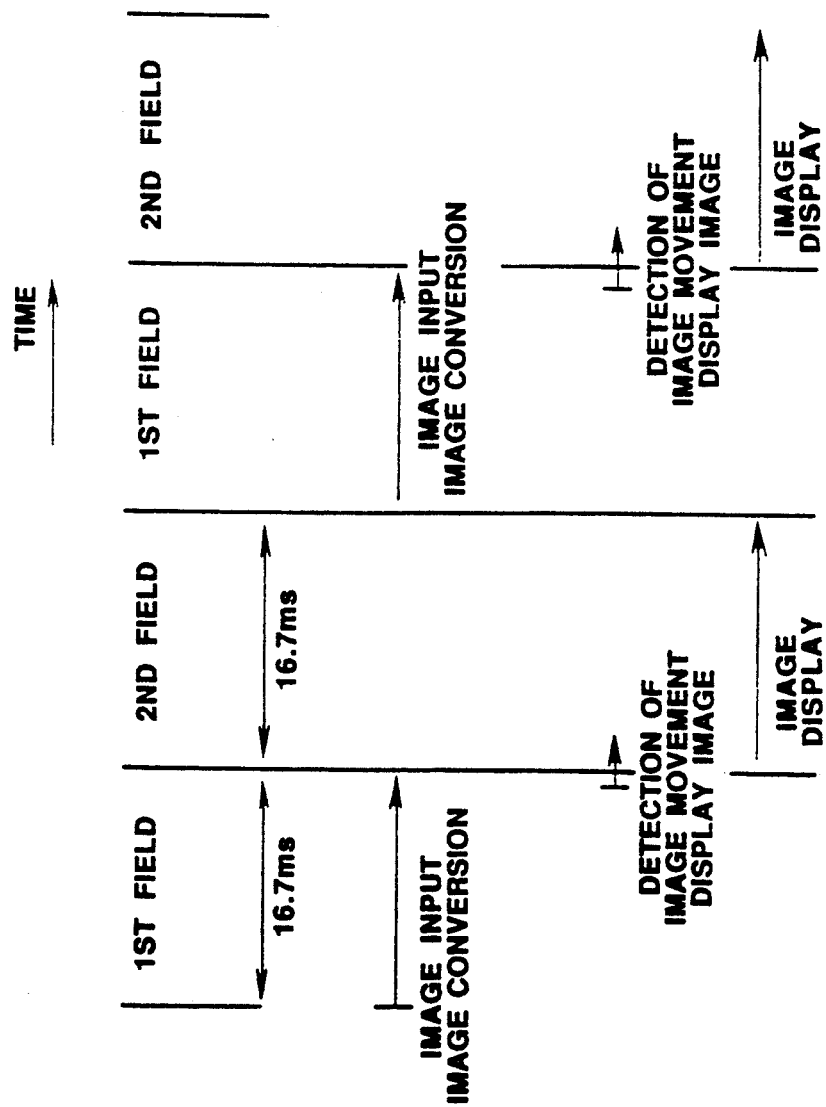
FIG. 6 is a timing chart used in explaining the image correcting operation.

The inputted image correcting operation will be described further in connection with FIG. 6. In a time duration (for example, 16.7 ms) during which the first field of an image is inputted, the inputted image A is converted into an image B. The inputted and converted images A and B are stored in different image memory sections. During the vertical retrace line interval, the vertical movement of the inputted image A with respect to an image having no influence of pitching movement of the television camera 10 is detected. In a time duration (for example 16.7 ms) during which the second field of the image is inputted, the inputted image is corrected based upon the detected vertical movement by shifting each pixel stored at an address y to an address y+Ys. The corrected image is displayed on the CRT 16.

Although description has been made to a vertical image movement detection, it is to be understood that this embodiment is equally applicable to detect a horizontal image movement. In this case, the inputted image is scanned in a series of horizontal scan lines. Similarly, virtual and horizontal image movements can be detected when the inputted image is scanned in a series of vertical scan lines and in a series of horizontal scan lines.

As apparent from the foregoing, the inputted image is shifted downward when the road ascends in front of a vehicle and is shifted upward when the road descends in front of the vehicle. This is effective to display a desired image before the vehicle starts ascending or descending.

The calculated horizontal and vertical image movements correspond to the yawing and pitching angles of a moving object, respectively, when the television camera 10 is fixed to the moving object. Thus, the horizontal and vertical image movements can be used to control the posture of the moving object. For example, the integrated value Ys corresponds to a pitching angle of a moving object such as a vehicle, helicopter, or the like having a television camera fixed thereon. The pitching angle $\theta$ with respect to the earth in the image is calculated as $$\theta = \tan^{-1} \frac{Dp}{F} \cdot Ys$$

where F (mm) is the focal length of the lens, Dp (mm) is the size of each of the pixels. The calculated pitching angle $\theta$ may be used to control the position of the moving object.

Figure 7:
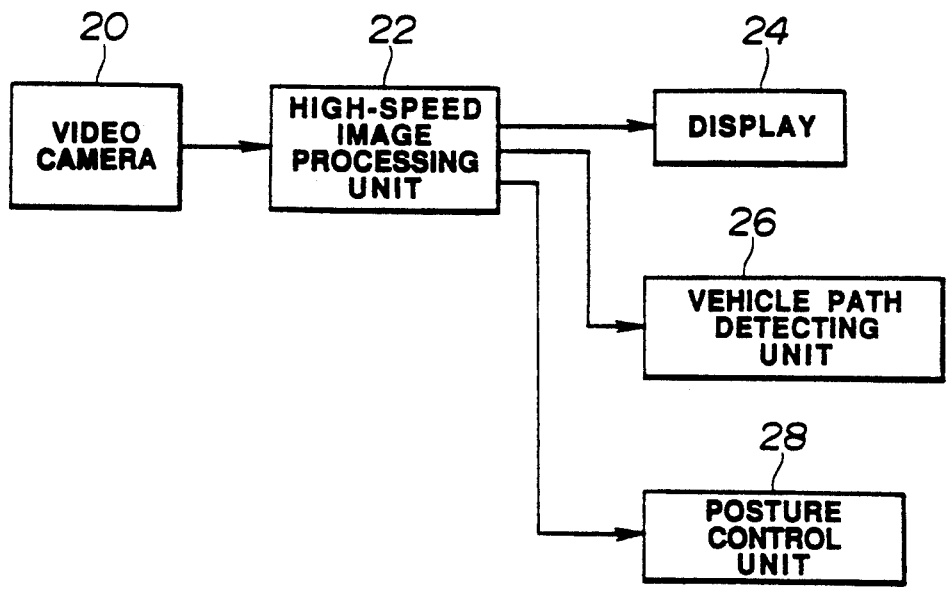
FIG. 7 is a schematic diagram showing a second embodiment of the image movement detecting apparatus of the invention.

Referring to FIG. 7, there is shown a second embodiment of the image processing apparatus of the invention. In this embodiment, the image processing apparatus comprises a television or video camera 20, a high-speed image processing unit 22, a display unit 24, a vehicle path detecting unit 26, and a posture control unit 28. The video camera 20 is mounted on a moving object including an automotive vehicle, an airplane, a helicopter, and the like. The image processing unit 22 receives a video signal from the television camera 20 and digitally stores the inputted image in an image memory at intervals of time (for example 33 ms). The stored image is represented by an M×N array of pixels each pixel A(x,y) being assigned a value representative of its intensity (darkness). The image processing unit 22 scans the inputted image in a series of raster scan lines to convert it into an array of points with each point E(x,y) having a value of 0 or 1. E(x,y)=1 represents an edge point forming an edge in the inputted image. The each point E(x,y) also has a value indicating a gradient $\alpha(x,y)$ of the edge at the edge point.

Figure 8:
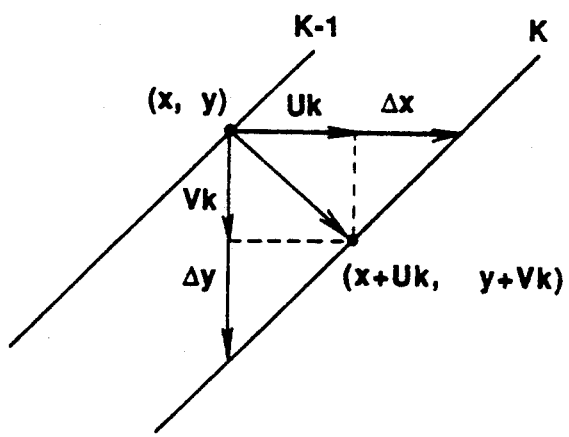
FIG. 8 is a diagram used in explaining the principles of the second embodiment of the invention.

The principles of this embodiment will be described with reference to FIG. 8. When the television camera 20 moves vertically and horizontally with respect to the vehicle held at rest, a certain point is represented by a pixel A(x,y,k) in an image inputted at a time k and the certain point is represented by a pixel A(x−uk, y−vk, k−1) in an image inputted at a time k−1 where uk and vk are the horizontal and vertical velocities equal to the horizontal and vertical distances obtained between the two pixels representing the certain point for a unit time $\Delta t$ (for example, 33 ms) or an interval between the time k−1 and the time k. If the certain point lies on a road side or a lane marker represented in the imputted image as a straight line expressed by a linear equation $y = \alpha \cdot x + \beta$, the following relationship will be satisfied between the position of the pixel A(x,y) in the image inputted at the time k−1 and the position of the pixel A(x+uk, y+yk) in the image inputted at the time k:

$$\frac{uk}{\Delta x} + \frac{vk}{\Delta y} - 1 = 0 \tag{1}$$

where $\Delta x$ is the movement of the straight line in the x direction and $\Delta y$ is the movement of the straight line in the y direction, as shown in FIG. 3. Since the unit time $\Delta t$ is very short, the gradient $\alpha$, which is expressed as $\alpha = \Delta y / \Delta x$, may be considered to be constant. Thus, Equation (1) may be rewritten as $$\frac{\alpha}{\Delta y} uk + \frac{1}{\Delta y} vk - 1 = 0 \tag{2}$$

Thus,
$$\alpha \cdot uk + vk = \Delta y \tag{3}$$

This means that a relationship between the velocities uk and vk can be obtained if the movement $\Delta y$ of the straight line in the y direction and the gradient $\alpha(=-\Delta y/\Delta x)$ of the straight line are known.

When the vehicle is moving, the velocities uk and vk vary with variations in the velocity of movement of the vehicle. However, the positions of the straight line representing a road edge, a lane marker or the like extending in parallel with the direction of movement of the vehicle are unchanged as long as the velocities uk and vk are zero. It is, therefore, possible to calculate the velocities uk and vk by solving Equation (3) therefor by using several pairs of values of $\alpha$ and $\Delta Y$ obtained for several pixels forming a straight line representing one of the road sides and/or lane markers.

It can be seen from Equation (3) that the straight line represented in the image inputted at the time $k-1$ will move in the y direction a distance $\Delta y$ expressed as $\Delta y = \alpha \cdot uk + vk$ if a desired point (x,y) moves at horizontal and vertical velocities uk and vk for the unit time. In other words, a desired point on the straight line represented in the image inputted at the time k will move a distance uk in the horizontal direction and a distance vk in the vertical direction if the straight line represented in the image inputted at the time k moves a distance $\Delta y = \alpha \cdot uk + vk$ in the vertical direction for the unit time.

In this embodiment, the image processing unit 22 assumes a predetermined number of sets of distance (velocity) values u and k, over the ranges $-up \leq u \leq up$ and $-vp \leq v \leq vp$, for horizontal and vertical distances uk and vk between pixels representing the same point in last and new images inputted successively. The values u and k indicate horizontal and vertical distances per unit time interval $\Delta t$ between the time $k-1$ when the last image is inputted and the time k when the new image is inputted. The image processing unit 22 stores an array of values with each value P(x,y) being incremented when the corresponding pixel A(x+xk,y+yk) is an edge point where xk and ky are the horizontal and vertical movements of the last image with respect to a reference image having no influence of movement of the television camera 20. The value P(x,y) will have a great value if the pixel A(x+xk,y+yk) appears repetitively as an edge point forming a part of a straight line such as a road side or lane marker extending in parallel with the direction of movement of the moving object. The image processing unit 22 produces a velocity histogram which stores an array of values with each value R(u,v), over the ranges $-up \leq u \leq up$ and $-vp \leq v \leq vp$, is incremented when the value P(x, y−ys) for a pixel spaced a vertical distance $ys = \alpha \cdot u + v$ away from each A(x+xk,y+yk) of the edge points is grater than a predetermined value for the corresponding one of the sets of distance values u and v. The character $\alpha$ indicates the gradient of the edge at the edge point E(x+xk,y+yk). Thus, the value R(u,v) indicates the number of edge points which satisfy Equation (3) for the corresponding one of sets of distance values u and k assumed for the horizontal and vertical distances uk and vk. The image processing unit 22 detects a greatest one of the values stored in the velocity histogram and one of the sets of distance values u and v corresponding to the maximum value R(u,v) in the histogram. The image processing unit 22 sets the detected distance values u and v for the horizontal and vertical distances uk and vk and calculates total horizontal and vertical movements of the new image with respect to the reference image as xk+uk and yk+vk. The calculated total horizontal and vertical movements may be utilized to correct the new image so as to cancel the influence of the movement of the television camera 20. The corrected image is displayed on the display unit 24. The calculated total horizontal and vertical movements may be utilized in the vehicle path detecting unit 26 to cancel the influence of movement of the television camera 20 from road shape measurements. Moreover, the calculated total horizontal and vertical movements may be utilized in the posture control unit 28 to detect movement of the moving object on which the television camera 20 is fixed and correct the posture of the moving object based upon the detected movement of the moving object.

The image processing unit 12 employs a digital computer including a central processing unit, a read only memory, a random access memory and an input/output control unit. The read only memory contains the program for operating the central processing unit.

Figure 9:
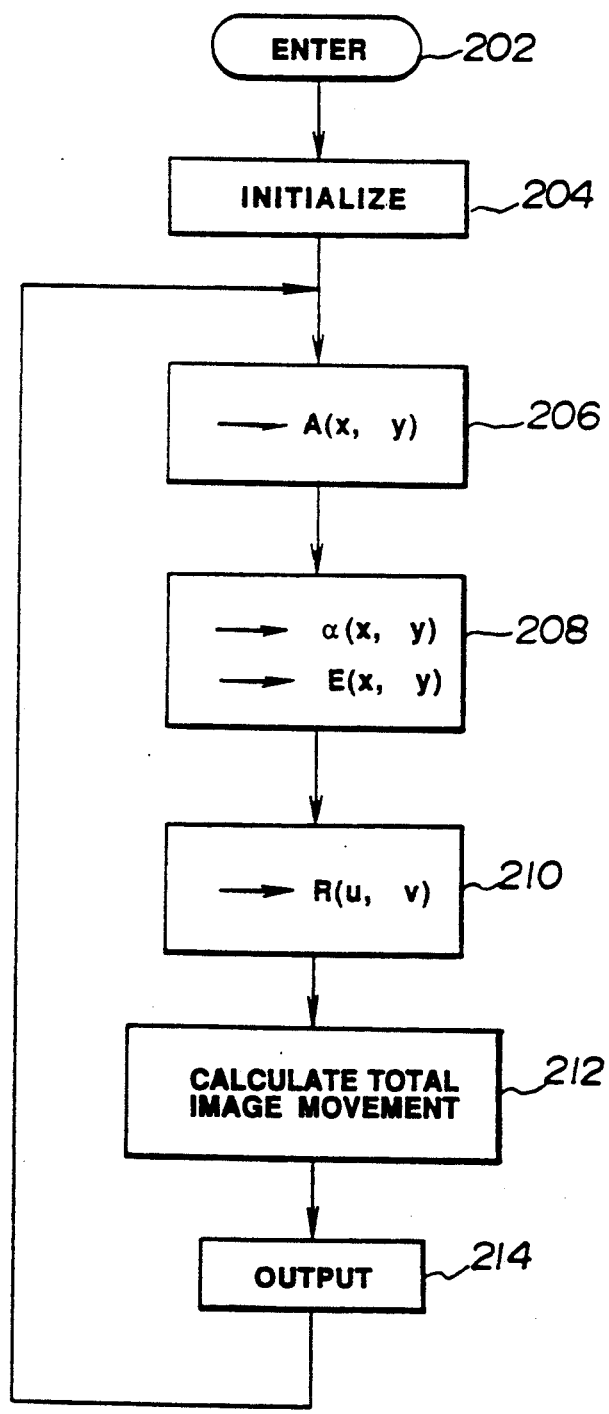
FIG. 9 is an overall flow diagram of the programming of the digital computer used in the image movement detecting apparatus of FIG. 7.

FIG. 9 is an overall flow diagram of the programming of the digital computer used in the image processing unit 22. The computer program is entered at the point 202. At the point 204 in the program, specified memory sections are initialized as will be described in detail. At the point 206 in the program, an image is inputted from the television camera 20 into the image processing unit 22. The inputted image A is represented by an 256×240 array of pixels. At the point 208 in the program, the inputted image A is converted into an image E representing edge points forming edges in the inputted image. This conversion is made by scanning the inputted image A in a series of raster scan lines to detects edge points having an intensity (brightness) distinct from the adjacent points. The inputted and converted images A and E are stored in different memory sections of the image memory included in the image processing unit 22. The converted image E is used to detect the horizontal and vertical movements of the inputted image from an image inputted when the television camera 20 does not move with respect to the moving object. The detected vertical and horizontal movements are utilized to correct the inputted image so as to cancel the influence of movement of the television camera 20.

At the point 210 in the program, a velocity histogram R is produced for a predetermined number of sets of values u and v assumed for horizontal and vertical distances uk and vk between pixels representing a point in two successive inputted images. At the point 212 in the program, the central processing unit searches a greatest one of the values R(u,v) stored in the velocity histogram to detect the horizontal and vertical velocities uk and vk and calculates the horizontal and vertical movements xk and yk of the inputted image. At this point, the central processing unit updates the values P(x,y) over the ranges $1 \leq x \leq M$ and $ymin \leq y \leq ymax$ where M is the number of pixels arranged in one horizontal scan line, ymin is the y coordinate of a point near the disappearing point, and ymax is the y coordinate of the pixels arranged in the lowermost horizontal scan line. At the point 214 in the program, the calculated horizontal and vertical movements xk and yk are outputted to the display unit 24, the vehicle path control unit 26 and/or the posture control unit 28. Following this, the program is returned to the point 206.

Figure 10:
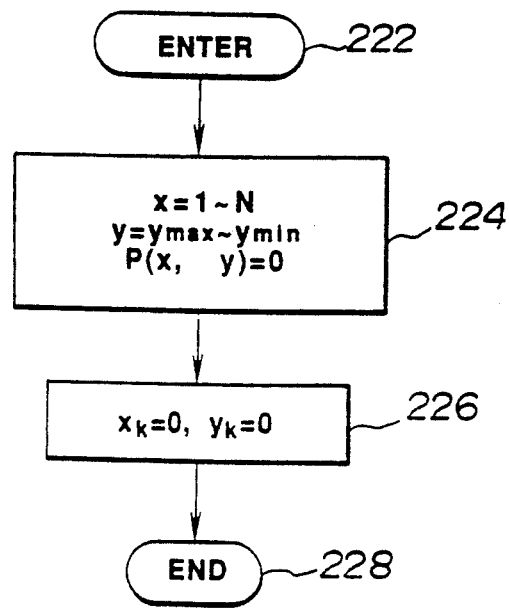
FIG. 10 is a flow diagram of the programming of the digital computer as it is used to initialize values stored in the memory sections.

FIG. 10 is a flow diagram of the programming of the digital computer as it is used to initialize the memory section. The computer program is entered at the point 222 which corresponds to the point 204 of FIG. 9. At the point 224 in the program, all of the values P(x,y) stored in an array are cleared to zero. At the point 226 in the program, the horizontal and vertical velocities xk and yk are cleared to zero. The program then proceeds to the end point 228 which corresponds to the point 206 of FIG. 9.

Figure 11:
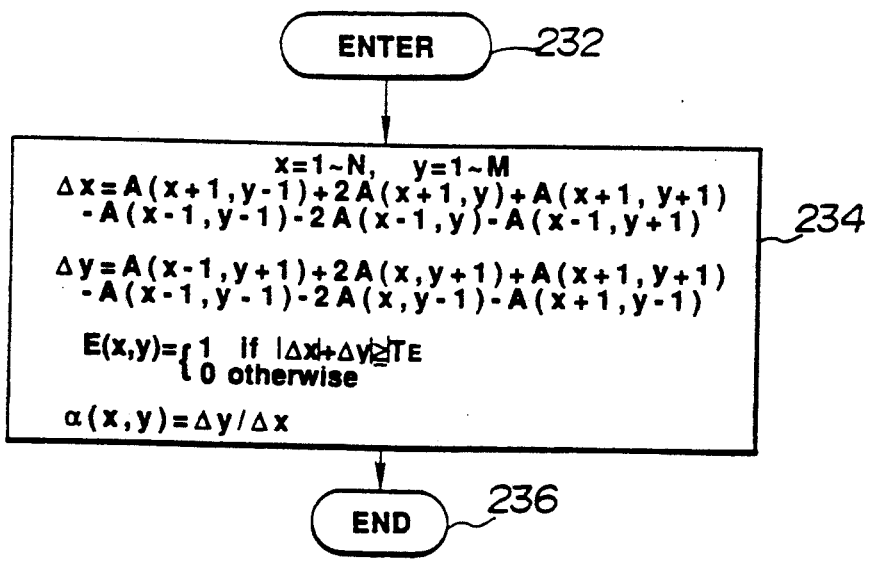
FIG. 11 is a flow diagram of the programming of the digital computer as it is used to converting an inputted image into an array of points representing edge points.

FIG. 11 is a flow diagram of the programming of the digital computer as it is used to convert the inputted image A into an array of points with each point E(x,y) having a value of 0 indicating that the pixel A(x,y) is not an edge point and a value of 1 indicating that the pixel A(x,y) is an edge point.

The computer program is entered at the point 232 which corresponds to the point 208 of FIG. 9. At the point 234 in the program, the inputted image A is scanned in a series of raster scan lines to detects edge points having an intensity (brightness) distinct from the adjacent points. For this conversion, a value ΔX differentiated in the X direction and a value ΔY differentiated in the Y direction are calculated for each point or pixel A(x,y) as $$\Delta X(x,y) = \{A(x + 1, y - 1) + 2 \cdot A(x + 1, y) + A(x + 1, y + 1)\} - \{A(x - 1, y - 1) + 2 \cdot A(x - 1, y) + A(x - 1, y + 1)\}$$

$$\Delta Y(x, y) = \{A(x - 1, y + 1) + 2 \cdot A(x, y + 1) + A(x + 1, y + 1)\} - \{A(x - 1, y - 1) + 2 \cdot A(x, y - 1) + A(x + 1, y - 1)\}$$

If $|\Delta X(x,y)| + |\Delta Y(x,y)| \geq TE$ where TE is an appropriate threshold value, then it means that the existing pixel A(x,y) forms an edge point and it is converted into E(x,y)=1. Otherwise, the existing pixel A(x,y) is converted into E(x,y)=0. The gradient α(x,y) of the edge at the edge point E(x,y) is calculated as $$\alpha(x,y) = \Delta Y(x,y)/\Delta X(x,y)$$

Following this, the program proceeds to the end point 236 which corresponds to the point 210 of FIG. 9.

FIGS. 12.1 and 12.2 are flow diagrams of the programming of the digital computer as it is used to produce a velocity histogram R. A predetermined number of pairs of values u and v are assumed for the horizontal and vertical velocities uk and vk over the ranges $-up \leq u \leq up$ and $-vp \leq v \leq vp$. The values up and vp may be 2 or 3 since the horizontal and vertical movements between two successive inputted images will be in a range of about ±2 or ±3 pixels if this program is executed at uniform intervals of time of 33 ms. The velocity histogram R is taken in the form of an array of values R(u,v) each of which represents the number of edge points satisfying Equation (3) for the corresponding one of sets of values u and k.

The computer program is entered at the point 242 which corresponds to the point 210 of FIG. 9. At the point 244 in the program, all of the values R(u,v) in the velocity histogram R are cleared to zero. At the pint 246 in the program, the x counter is reset to its initial value of 1. At the point 248 in the program, the Nx counter is cleared to zero. At the point 250 in the program, the y counter is reset to its maximum value ymax.

At the point 252 in the program, a determination is made as to whether or not the point E(x+xk, y+yk) does not have a value of 0. The characters xk and yk indicate horizontal and vertical movements of the image inputted in the last cycle of execution of the program with respect to an image inputted when there is no influence of movement of the television camera 20 on the inputted image. If the answer to this question is "yes", then it means that the point E(x+xk, y+yk) is an edge point and the program proceeds to the point 262. Otherwise, the program proceeds to the point 254 where the y counter is decremented by one step. At the point 256 in the program, a determination is made as to whether or not the count of the y counter is less than its minimum value ymin. If the answer to this question is "yes", then it means that all of the pixels in the existing vertical scan line specified by the count of the x counter have been searched and the program proceeds to the point 258. Otherwise, the program is returned to the point 252. At the point 258 in the program, the x counter is incremented by one step. The program then proceeds to a determination step at the point 260. This determination is as to whether or not the count of the x counter is greater than its maximum value M. If the answer to this question is "yes", then it means that all of the points in the converted image E(x,y) have been processed and the program proceeds to the end point 284. Otherwise, the program is returned to the point 248.

If the answer to the question inputted at the point 252 is "yes", then the program proceeds to the point 262 where the Nx counter is incremented by one step. The Nx counter accumulates a count indicating the number of edge points arranged in the existing vertical scan line specified by the count of the x counter. The program then proceeds to a determination step at the point 264. This determination is as to whether or not the count of the Nx counter is greater than a predetermined value Tn. If the answer to this question is "yes", then it means that this edge point does not form an edge positioned above the road side and/or lane marker and the program proceeds to the point 258. Otherwise, the program proceeds to the point 266. Since the inputted image is scanned bottom-to-top in each of the vertical scan lines, the edge found in the initial stage of the scanning operation represents the road side and/or lane marker and the edge found in the subsequent stage of the scanning operation represents a guardrail positioned above the road side and/or lane marker. In this embodiment, the velocity histogram R(u,v) is produced only for the road side and/or lane marker.

At the point 266 in the program, the v counter is reset to its minimum value −vp (for example, −2); that is, the minimum value −vp is assumed initially for the vertical velocity vk. At the point 268 in the program, the u counter is reset to its minimum value −up (for example, −2); that is, the minimum value −up is assumed initially for the horizontal velocity uk. At the point 270 in the program, a vertical distance ys is calculated as $$ys = a(x+xk, y+yk) \cdot u + v$$

where $a(x+xk,y+yk)$ represents the gradient $\Delta y/\Delta x$ of the edge at the edge point $E(x+xk,y+yk)$.

At the point 272 in the program, a determination is made as to whether or not P(x, y−ys) has a value equal to or greater than a predetermined value Tp. When the assumed values u and k are correct to represent the horizontal and vertical velocities uk and vk and when the edge point (x+xk,y+yk) represents an edge of the road side or lane marker in the image inputted in this cycle of execution of the program, the value P(x,y−ys) has a great value exceeding the threshold value Tp since the inputted image moves from a position (y−ys) to a position y. If the answer to this question is "yes", then it means that the values u and v assumed for the horizontal and vertical velocities uk and vk are correct to satisfy Equation (3) and the program proceeds to the point 274 where the value R(u,v) of the velocity histogram is updated by R(u,v)+1; that is, the value R(u,v) stored at the location (u,v) addressed by the counts of the u and v counters is incremented by 1 and then to the point 276. Otherwise, the program proceeds directly to the point 276 where the u counter is incremented by one step.

At the point 278 in the program, a determination is made as to whether or not the count of the u counter is greater than its maximum value up (for example, 2). If the answer to this question is "yes", then the program proceeds to the point 280. Otherwise, the program is returned to the point 268. At the point 280 in the program, the v counter is incremented by one step. The program then proceeds to a determination step at the point 282. This determination is as to whether or not the count of the v counter is greater than its maximum value (for example, 2). If the answer to this question is "yes", then the program proceeds to the point 254. Otherwise, the program is returned to the point 268.

Figure 13:
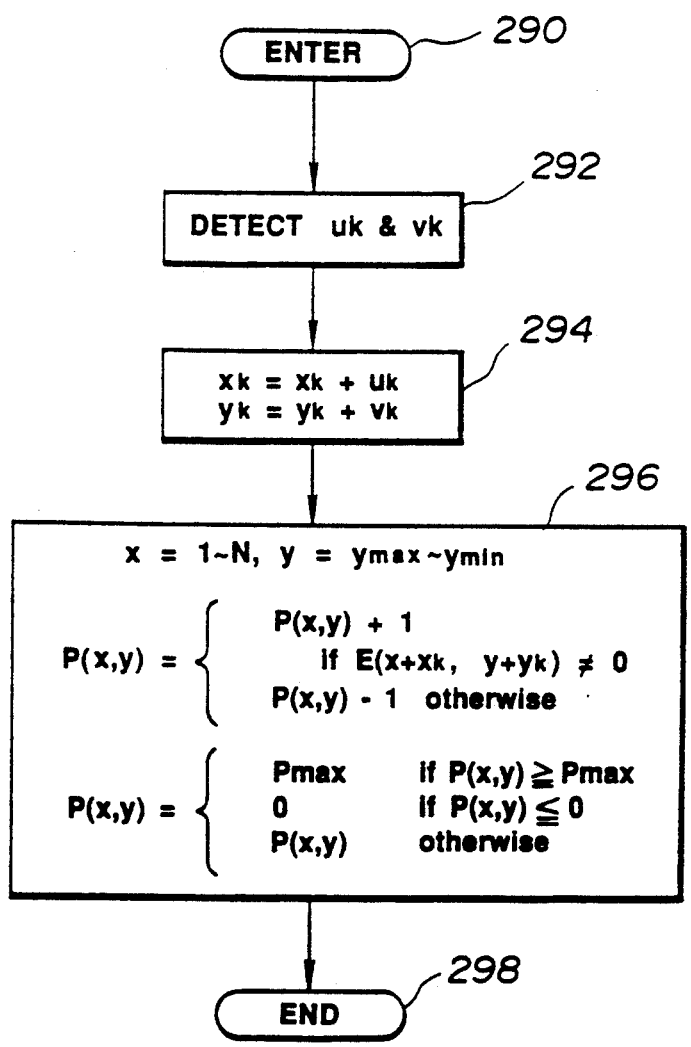
FIG. 13 is a flow diagram of the programming of the digital computer as it is used to measuring the movement of an image with respect to a reference image having no influence of movement of the television camera.

FIG. 13 is a flow diagram of the programming of the digital computer as it is used to calculate the horizontal and vertical movements xk and yk of the inputted image with respect to an image having no influence of movement of the television camera 20 and to update the array of values P(x,y).

The computer program is entered at the point 292 which corresponds to the point 212 of FIG. 9. At the point 290 in the program, the central processing unit searches a greatest one of the values R(u,v) stored in the velocity histogram and the corresponding one of the sets of velocity values u and v. The detected values u and k are set for the horizontal and vertical velocities uk and vk. At the point 294 in the program, the last horizontal and vertical movements xk and yk are updated as xk=xk+uk and yk=yk+vk. The new values xk and yk indicate the horizontal and vertical movements of the image inputted in this cycle of execution of the program with respect to an image having no influence of movement of the television camera 20.

At the point 296 in the program, values P(x,y) are updated by scanning the converted image E(x,y) over the ranges $1 \leq x \leq M$ and ymin $\leq y \leq$ ymax. If $E(x+xk,y+yk)$ is not 0, then the value P(x,y) is incremented by 1. Otherwise, the value P(x,y) is decremented by 1. The value P(x,y) is limited between a maximum value Pmax and a minimum value 0. For this purpose, the value P(x,y) is set to the maximum value Pmax if it is equal to or greater than the maximum value Pmax. The value P(x,y) is set at 0 if it is equal to or less than 0. Following this, the program proceeds to the end point 298 which corresponds to the point 214 of FIG. 9.

Each value P(x,y) indicates the number of times the corresponding pixel A(x+xk,y+yk) has been an edge point. The value P(x,y) is decremented by 1 rather than reset to 0 when the corresponding pixel is not an edge point. Thus, the value P(x,y) has a great value for a broken line such as a center line. It is to be noted that the value P(x,y) may be incremented by 2 or 3 when the corresponding pixel A(x+xk,y+yk) is an edge point. The use of the array of values P(x,y) is effective to minimize errors produced in measuring the horizontal and vertical velocities uk and vk. For example, if the velocity measuring operation is made only for two successive inputted images, an error is accumulated in the vertical and horizontal movements xk and yk since the assumed horizontal and vertical velocities uk and vk are integers. In this embodiment, the horizontal and vertical movements xk and yk can be measured without the danger of accumulating errors.

Figure 14:
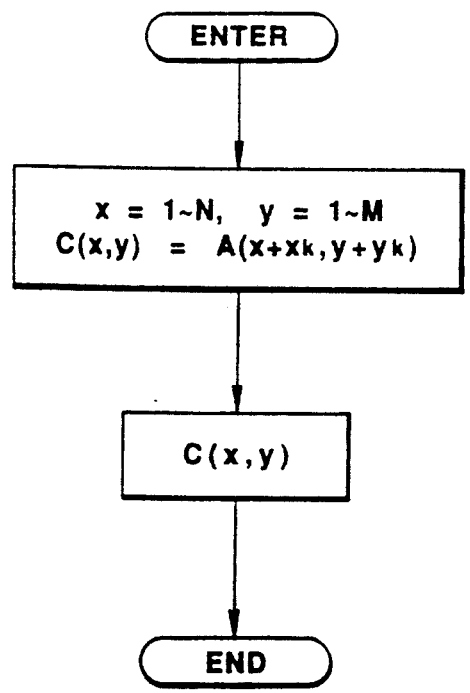
FIG. 14 is a flow diagram of the programming of the digital computer as it is used to correct the inputted image to cancel the influence of movement of the television camera.

FIG. 14 is a flow diagram of the programming of the digital computer as it is used to correct the inputted image to cancel the influence of movement of the television camera 20. The inputted image A is converted or corrected into an image C in such a manner that each pixel A(x+xk,y+yk) is stored at address C(x,y). In this manner, the inputted image A is shifted an amount xk in the x direction and an amount yk in the y direction. The corrected image is displayed on the CRT 24.

Figure 15:
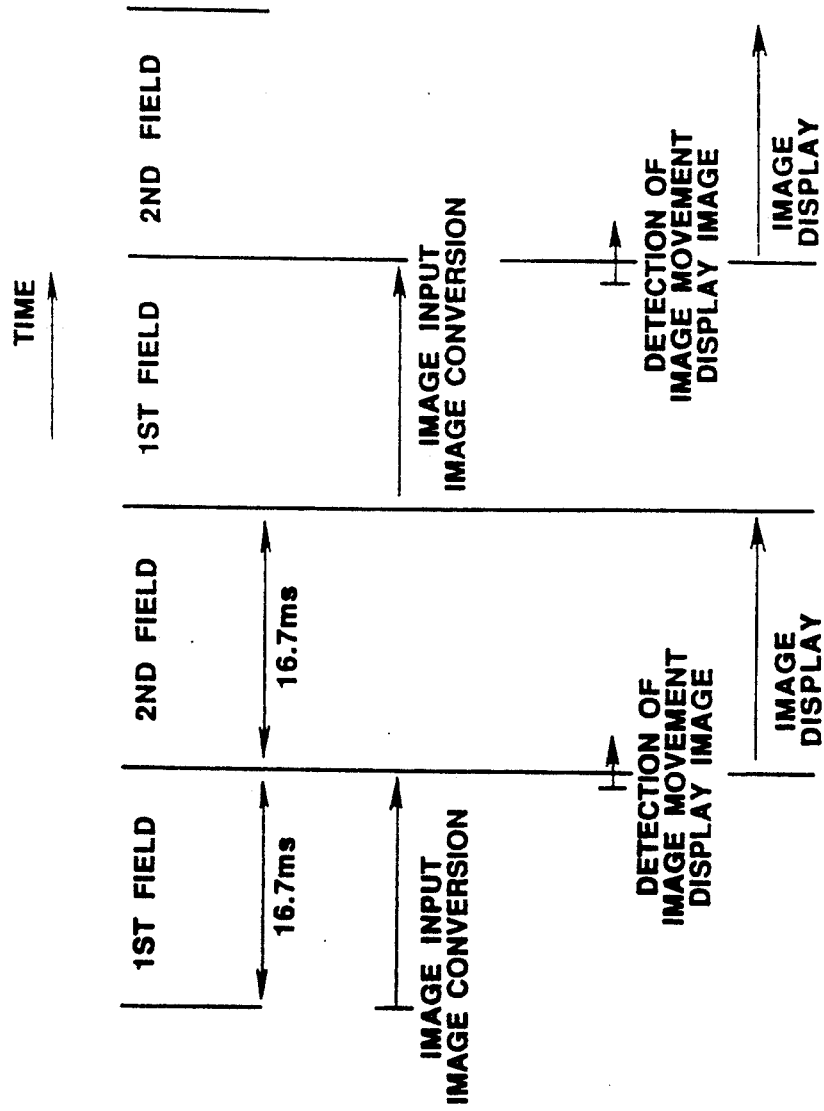
FIG. 15 is a timing chart used in explaining the image correcting operation.

The inputted image correcting operation will be described further in connection with FIG. 15. In a time duration (for example, 16.7 ms) during which the first field of an image is inputted, the inputted image A is converted into an image B. The inputted and converted images A and B are stored in different image memory sections. During the vertical retrace line interval, the movement of the inputted image A with respect to an image having no influence of movement of the television camera 10 is detected. In a time duration (for example 16.7 ms) during which the second field of the image is inputted, the inputted image is corrected based upon the detected movement by shifting each pixel A(x+xk,y+yk) stored at an address (x+xk,y+yk) to an address (x,y). The corrected image is displayed on the CRT 24.

As apparent from the foregoing, the inputted image is shifted downward when the road ascends in front of a vehicle and is shifted upward when the road descends in front of the vehicle. This is effective to display a desired image before the vehicle starts ascending or descending.

The calculated horizontal and vertical image movements correspond to the yawing and pitching angles of a moving object, respectively, when the television camera 20 is fixed to the moving object. Thus, the horizontal and vertical image movements xk and yk can be used to control the posture of the moving object.

In addition, the calculated horizontal and vertical movements xk and yk may be utilized in the vehicle path detecting unit 26 to cancel the influence of movement of the television camera 20 from road shape measurements.

Although description has been made to measure the horizontal and vertical movements xk and yk of the inputted image, it is to be understood that this embodiment is equally applicable to measure a vertical movement yk only. In this case, the image processing unit 22 assumes a predetermined number of values v for a vertical distance vk between pixels representing the same edge points in last and new image inputted successively, stores an array of values each P(x,y) of which is incremented when the corresponding pixel A(x,y+yk) is an edge point where ky is the vertical movement of the last image with respect to a reference image having no influence of movement of the television camera, produces a velocity histogram storing an array of values each R(v) of which is incremented when the value P(x,y−v) for a pixel spaced a vertical distance v away from each A(x,y+yk) of the edge points is greater than a predetermined value for the corresponding one of the distance values v, detects a greatest one of the values stored in the velocity histogram and the corresponding one of the distance values v, sets the detected distance value v for the vertical distance vk, and calculates a total vertical movement of the new image with respect to the reference image as yk+vk.

Figure 16:
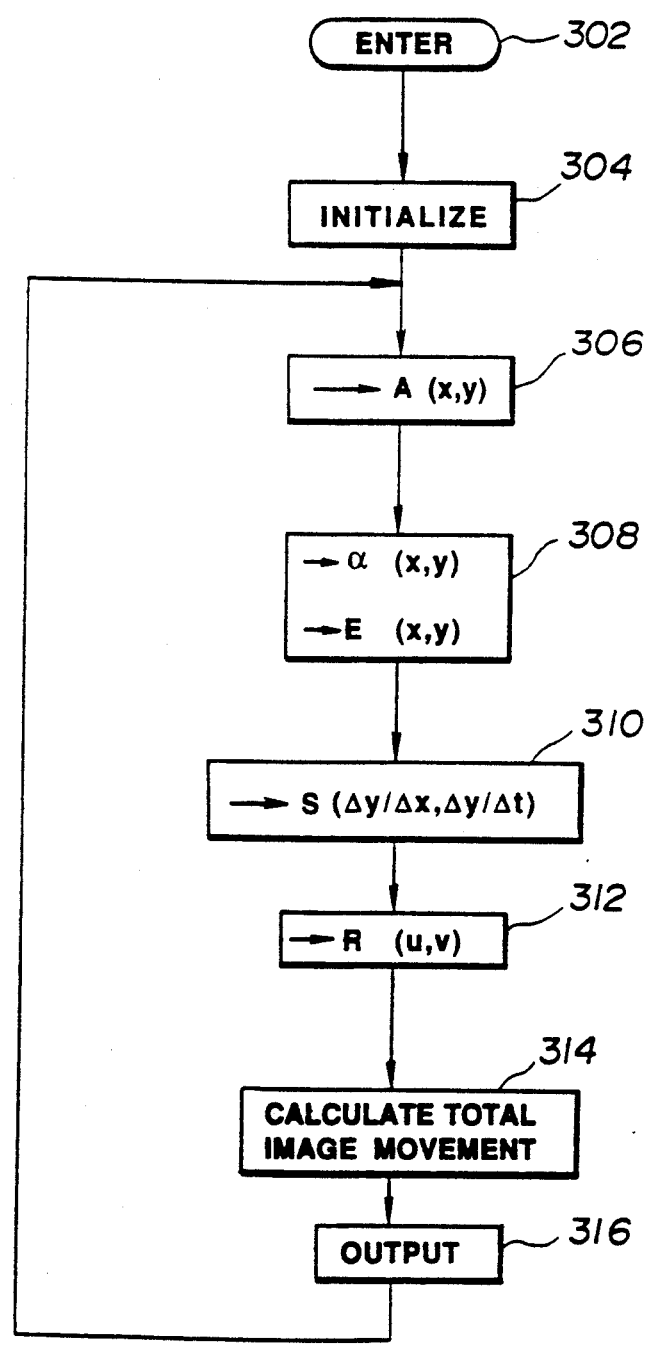
FIG. 16 is an overall flow diagram of the programming of the digital computer used in a modified form of the image movement detecting apparatus of FIG. 7.

FIG. 16 is an overall flow diagram of the programming of the digital computer used in a modified form of the image processing unit 22. In this modification, a predetermined number of distance values yp is assumed for the vertical distance ys. The image processing unit 22 produce a gradient/distance histogram storing an array of values with each value S(r,s) being stored in connection with a gradient value r and a distance value s. Each of the values stored in the gradient/distance histogram is incremented by one step with the corresponding gradient value r being set at $\alpha(x+xk, y+yk) \cdot G$ where G is a constant used in expressing the gradient value r as an integer and the corresponding distance value s being set at a distance value yp assumed for the vertical distance ys when the value P(x, x−yp) for a pixel spaced a vertical distance ys equal to the assumed distance value yp away from each A(x+xk,y+yk) of the edge points is greater than a predetermined value. A predetermined number of sets of distance (velocity) values u and v are assumed for the horizontal and vertical distances uk and vk between pixels representing the same edge points in last and new images inputted successively. The image processing unit 22 produces a velocity histogram storing an array of values with each value R(u,v) being incremented by $$\sum_r S(r, u \cdot r/G + v)$$

The image processing unit 22 detects a greatest one of the values stored in the velocity histogram and the corresponding one of the sets of distance values u and v. The detected distance values u and k are set for the horizontal and vertical distances uk and vk. The total horizontal and vertical movements of the new image are calculated as xk+uk and yk+vk, respectively.

The computer program is entered at the point 302. At the point 304 in the program, specified memory sections are initialized as will be described in detail. At the point 306 in the program, an image is inputted from the television camera 20 into the image processing unit 22. The inputted image A is represented by an 256×240 array of pixels. At the point 308 in the program, the inputted image A is converted into an image E representing edge points forming edges in the inputted image. This conversion is made by scanning the inputted image A in a series of raster scan lines to detect edge points having an intensity (brightness) distinct from the adjacent points. The inputted and converted images A and E are stored in different memory sections of the image memory included in the image processing unit 22. The converted image E is used to detect the horizontal and vertical movements of the inputted image from an image inputted when the television camera 20 does not move with respect to the moving object. The detected vertical and horizontal movements are utilized to correct the inputted image so as to cancel the influence of movement of the television camera 20.

At the point 310 in the program, a gradient/distance histogram S is produced. At the point 312 in the program, the central processing unit employs the produced gradient/distance histogram S to produce a velocity histogram R for a predetermined number of sets of values u and v assumed for horizontal and vertical distances uk and vk between pixels representing a point in two successive inputted images. At the point 314 in the program, the central processing unit searches a greatest one of the values R(u,v) stored in the velocity histogram to detect the horizontal and vertical velocities uk and vk and calculates the horizontal and vertical movements xk and yk of the inputted image. At this point, the central processing unit updates the values P(x,y) over the ranges $1 \leq X \leq M$ and $ymin \leq y \leq ymax$ where M is the number of pixels arranged in one horizontal scan line, ymin is the y coordinate of a point near the disappearing point, and ymax is the y coordinate of the pixels arranged in the lowermost horizontal scan line. At the point 316 in the program, the calculated horizontal and vertical movements xk and yk are outputted to the display unit 24, the vehicle path control unit 26 and/or the posture control unit 28. Following this, the program is returned to the point 306.

Figure 17:
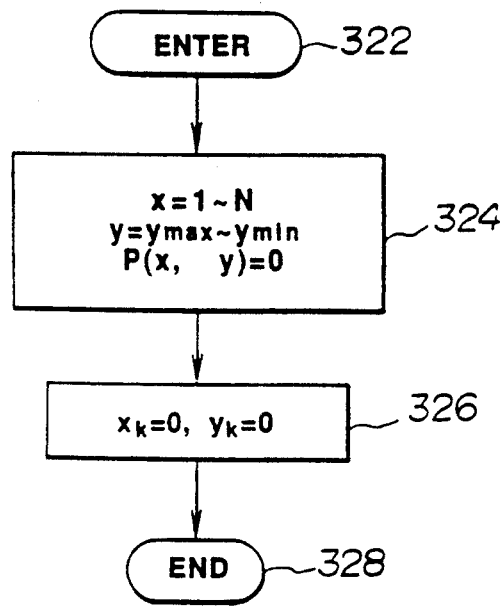
FIG. 17 is a flow diagram of the programming of the digital computer as it is used to initialize values stored in the memory sections.

FIG. 17 is a flow diagram of the programming of the digital computer as it is used to initialize the memory section. The computer program is entered at the point 322 which corresponds to the point 304 of FIG. 16. At the point 324 in the program, all of the values P(x,y) stored in an array are cleared to zero. At the point 326 in the program, the horizontal and vertical velocities xk and yk are cleared to zero. The program then proceeds to the end point 328 which corresponds to the point 306 of FIG. 16.

Figure 18:
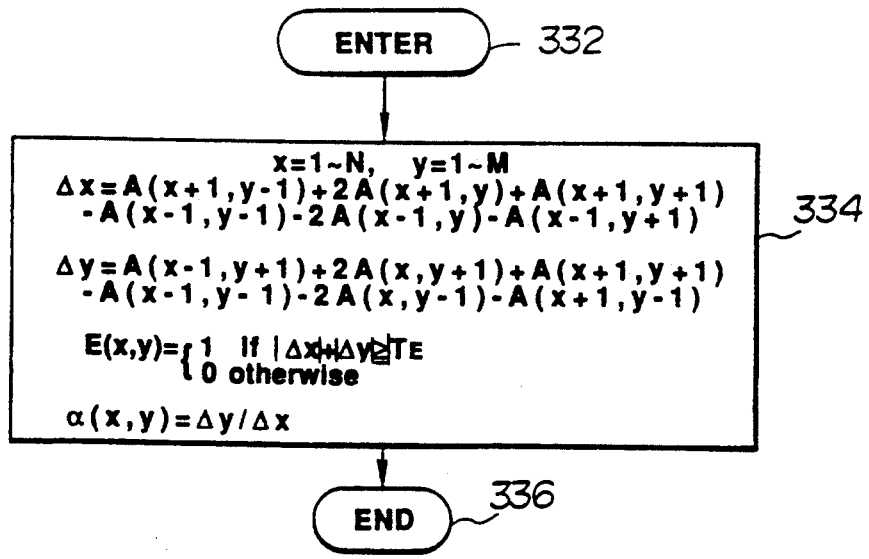
FIG. 18 is a flow diagram of the programming of the digital computer as it is used to converting an inputted image into an array of points representing edge points.

FIG. 18 is a flow diagram of the programming of the digital computer as it is used to convert the inputted image A into an array of points with each point E(x,y) having a value of 0 indicating that the pixel A(x,y) is not an edge point and a value of 1 indicating that the pixel A(x,y) is an edge point.

The computer program is entered at the point 332 which corresponds to the point 308 of FIG. 16. At the point 334 in the program, the inputted image A is scanned in a series of raster scan lines to detects edge points having an intensity (brightness) distinct from the adjacent points. For this conversion, a value ΔX differentiated in the X direction and a value ΔY differentiated in the Y direction are calculated for each point or pixel A(x,y) as $$\Delta X(x,y) = \{A(x+1, y-1) + 2 \cdot A(x+1, y) +$$
$$A(x+1, y+1)\} - \{A(x-1, y-1) +$$
$$2 \cdot A(x-1, y) + A(x-1, y+1)\}$$

$$\Delta Y(x,y) = \{A(x-1, y+1) + 2 \cdot A(x, y+1) +$$
$$A(x+1, y+1)\} - \{A(x-1, y-1) +$$
$$2 \cdot A(x, y-1) + A(x+1, y-1)\}$$

If $|\Delta X(x,y)| + |\Delta Y(x,y)| >$ TE where TE is an appropriate threshold value, then it means that the existing pixel $A(x,y)$ forms an edge point and it is converted into $E(x,y) = 1$. Otherwise, the existing pixel $A(x,y)$ is converted into $E(x,y) = 0$. The gradient $\alpha(x,y)$ of the edge at the edge point $E(x,y)$ is calculated as $$\alpha(x,y) = \Delta Y(x,y)/\Delta X(x,y)$$

Following this, the program proceeds to the end point 336 which corresponds to the point 310 of FIG. 16.

Figure 19:
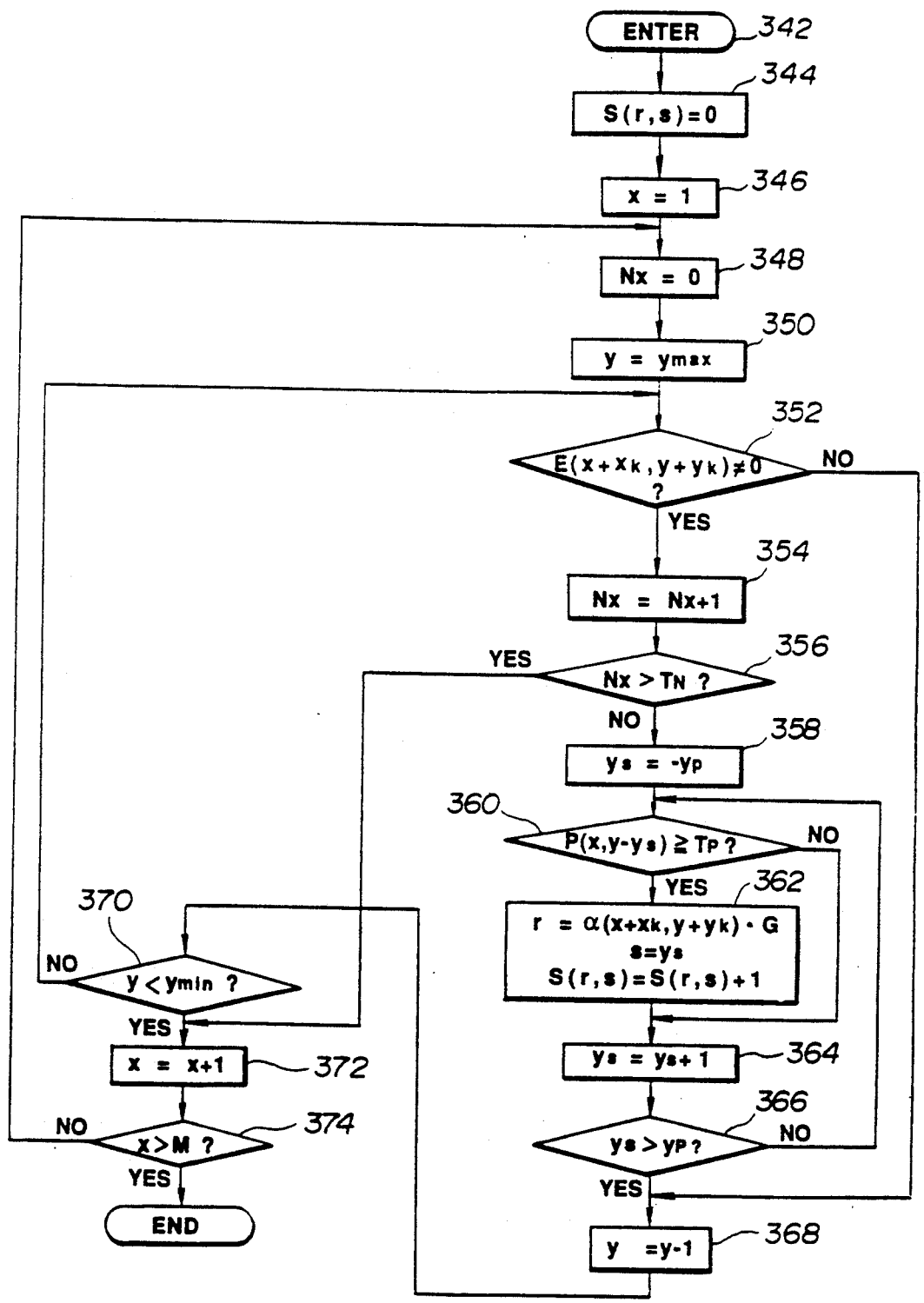
FIG. 19 is a flow diagram of the programming of the digital computer as it is used to produce a gradient/distance histogram.

FIG. 19 is a flow diagram of the programming of the digital computer as it is used to produce a gradient/distance histogram S. A predetermined number of values are assumed for the vertical distance ys over $-yp \leq ys \leq yp$. The value yp may be 5.

The computer program is entered at the point 342 which corresponds to the point 210 of FIG. 16. At the point 344 in the program, all of the values $S(r,s)$ in the gradient/distance histogram S are cleared to zero. The character r indicates a gradient value which corresponds to $\Delta x/\Delta y$ and it is calculated as $r = \Delta x/\Delta y \cdot G$ where G is a constant used to express the gradient value r as an integer. If $G = 16$, $-64 \leq r \leq 64$. The character s indicates a vertical distance value which corresponds to $\Delta x/\Delta t$. For example, $-5 \leq s \leq 5$ if the unit time $\Delta t$ is as short as 33 ms. At the point 346 in the program, the x counter is reset to its initial value of 1. At the point 348 in the program, the Nx counter is cleared to zero. At the point 350 in the program, the y counter is reset to its maximum value ymax.

At the point 352 in the program, a determination is made as to whether or not the point $E(x+xk, y+yk)$ does not have a value of 0. The characters xk and yk indicate horizontal and vertical movements of the image inputted in the last cycle of execution of the program with respect to an image having no influence of movement of the television camera 20. If the answer to this question is "yes", then it means that the point $E(x+xk, y+yk)$ is an edge point and the program proceeds to the point 354. Otherwise, the program proceeds to the point 368 where the y counter is decremented by one step.

At the point 354 in the program, the Nx counter is incremented by one step. The Nx counter accumulates a count indicating the number of edge points arranged in the existing vertical scan line specified by the count of the x counter. The program then proceeds to a determination step at the point 356. This determination is as to whether or not the count of the Nx counter is greater than a predetermined value Tn. If the answer to this question is "yes", then it means that this edge point does not form an edge positioned above the road side and/or lane marker and the program proceeds to the point 372. Otherwise, the program proceeds to the point 358. Since the inputted image is scanned bottom-to-top in each of the vertical scan lines, the edge found in the initial stage of the scanning operation represents the road side and/or lane marker and the edge found in the subsequent stage of the scanning operation represents a guardrail positioned above the road side and/or lane marker. In this embodiment, the gradient/distance histogram S is produced only for the road side and/or lane marker.

At the point 358 in the program, the ys counter is reset to its minimum value $-yp$ (for example, 5); that is, the minimum value $-yp$ is assumed initially for the vertical distance ys. At the point 360 in the program, a determination is made as to whether or not $P(x, y-ys)$ has a value equal to or greater than a predetermined value Tp. If the answer to this question is "yes", then it means that the point $P(x, y-ys)$ and the point $E(x+xk, y+yk)$ are judged to represent the same point and the program proceeds to the point 362. Otherwise, the program proceeds directly to the point 364.

At the point 362 in the program, the gradient value r is set as $r = \alpha(x+xk, y+yk) \cdot G$ where $\alpha(x+xk, y+yk)$ represents the gradient $\Delta y/\Delta x$ of the edge at the edge point $E(x+xk, y+yk)$ and the vertical distance value s is set at ys. At this point, the value $S(r,s)$ is incremented by one step. At the point 364 in the program, the ys counter is incremented by one step. At the point 366 in the program, a determination is made as to whether or not the count of the ys counter is greater than its maximum value yp (for example, 5). If the answer to this question is "yes", then the program proceeds to the point 368. Otherwise, the program is returned to the point 360. At the point 368 in the program, the y counter is decremented by one step. At the point 370 in the program, a determination is made as to whether or not the count of the y counter is less than its minimum value ymin. If the answer to this question is "yes", then it means that all of the pixels in the existing vertical scan line specified by the count of the x counter have been searched and the program proceeds to the point 372. Otherwise, the program is returned to the point 352. At the point 372 in the program, the x counter is incremented by one step. The program then proceeds to a determination step at the point 374. This determination is as to whether or not the count of the x counter is greater than its maximum value M. If the answer to this question is "yes", then it means that all of the points in the converted image $E(x,y)$ have been processed and the program proceeds to the end point 376. Otherwise, the program is returned to the point 348.

Figure 20:
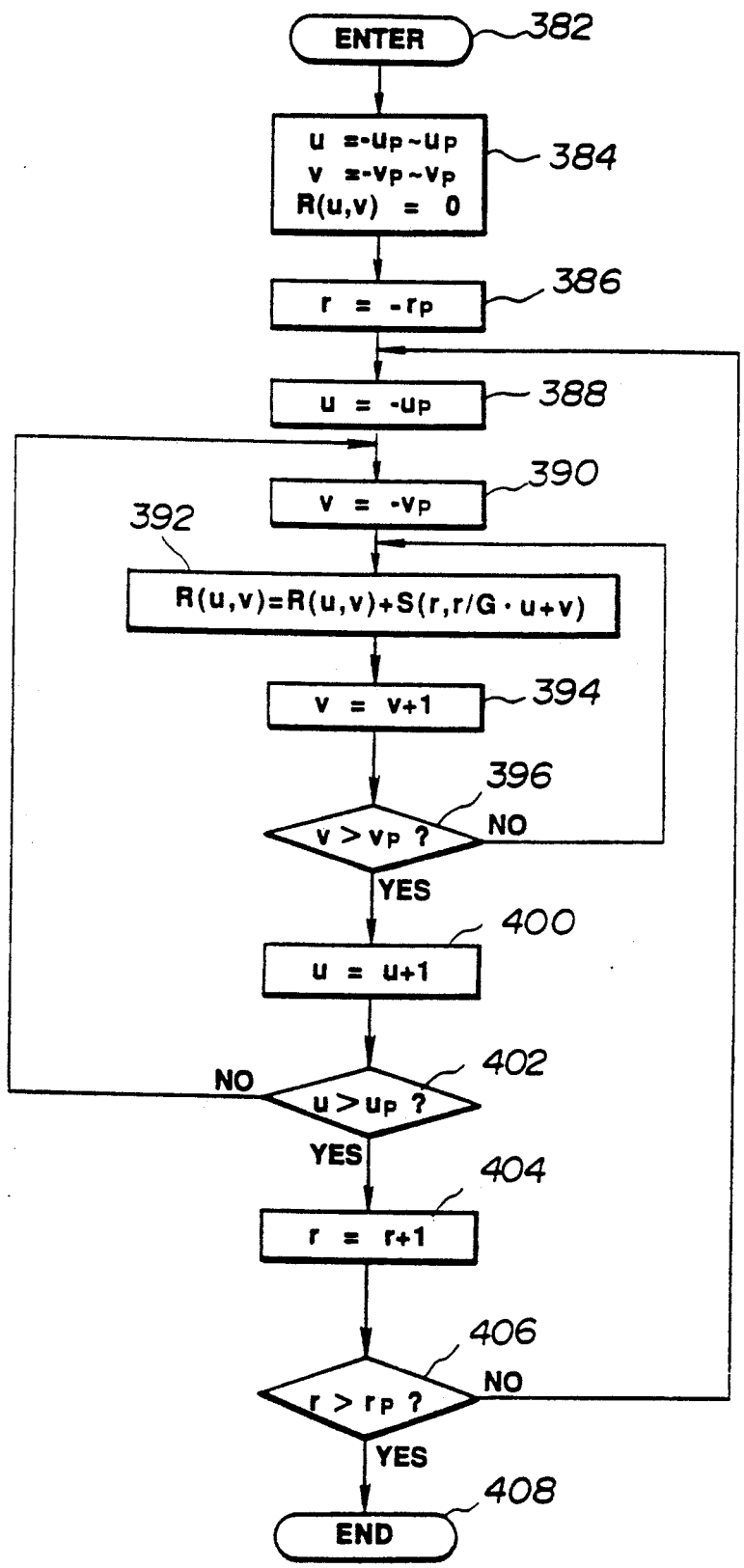
FIG. 20 is a flow diagram of the programming of the digital computer as it is used to produce a velocity histogram.

FIG. 20 is a flow diagram of the programming of the digital computer as it is used to produce a velocity histogram R. For this purpose, the gradient/distance histogram S is scanned over the ranges $-rp \leq r \leq rp$. A predetermined number of pairs of values u and v are assumed for the horizontal and vertical velocities uk and vk over the ranges $-up \leq u \leq up$ and $-vp \leq v \leq vp$. The values up and vp may be 2 or 3 since the horizontal and vertical movements between two successive inputted images will be in a range of about $\pm 2$ or $\pm 3$ pixels if this program is executed at uniform intervals of time of 33 ms. The velocity histogram R is taken in the form of an array of values $R(u,v)$ each of which represents the number of edge points satisfying Equation (3) for the corresponding one of sets of values u and k. The gradient/distance histogram S is taken in the form of an array of values $S(r,s)$ each of which represents the number of edge points satisfying conditions $r = \alpha \cdot G$ and $s = \Delta y$. Thus, $$R(u, v) = \sum_r S(r, a \cdot u + v) = \sum_r S(r, u \cdot r/G + v)$$

The computer program is entered at the point 384 which corresponds to the point 312 of FIG. 16. At the point 384 in the program, all of the values R(u,v) stored in the velocity histogram R are cleared to zero. At the point 386 in the program, the r counter is reset to its minimum value −rp (for example, −64). At the point 388 in the program, the u counter is reset to its minimum value −up (for example, −2); that is, the minimum value −up is assumed initially for the horizontal velocity uk. At the point 390 in the program, the v counter is reset to its minimum value −vp (for example, −2); that is, the minimum value −vp is assumed initially for the vertical velocity vk.

At the point 392 in the program, the value R(u,v) stored in the velocity histogram R at the location (u,v) specified by the counts of the u and v counters is updated by R(u,v)+S(r, u·r/G+v). The program then proceeds to the point 394 where the count of the v counter is incremented by one step. At the point 396 in the program, a determination is made as to whether or not the count of the v counter is greater than its maximum value vp (for example, 2). If the answer to this question is "yes", then the program proceeds to the point 400. Otherwise, the program is returned to the point 392.

At the point 400 in the program, the count of the u counter is incremented by one step. At the point 402 in the program, a determination is made as to whether or not the count of the u counter is greater than its maximum value up (for example, 2). If the answer to this question is "yes", then the program proceeds to the point 404 where the r counter is incremented by one step. Otherwise, the program is returned to the point 390. At the point 404 in the program, the count of the r counter is incremented by one step. The program then proceeds to a determination step at the point 406. This determination is as to whether or not the count of the r counter is greater than its maximum value (for example, 64). If the answer to this question is "yes", then the program proceeds to the end point 408. Otherwise, the program is returned to the point 388.

Figure 21:
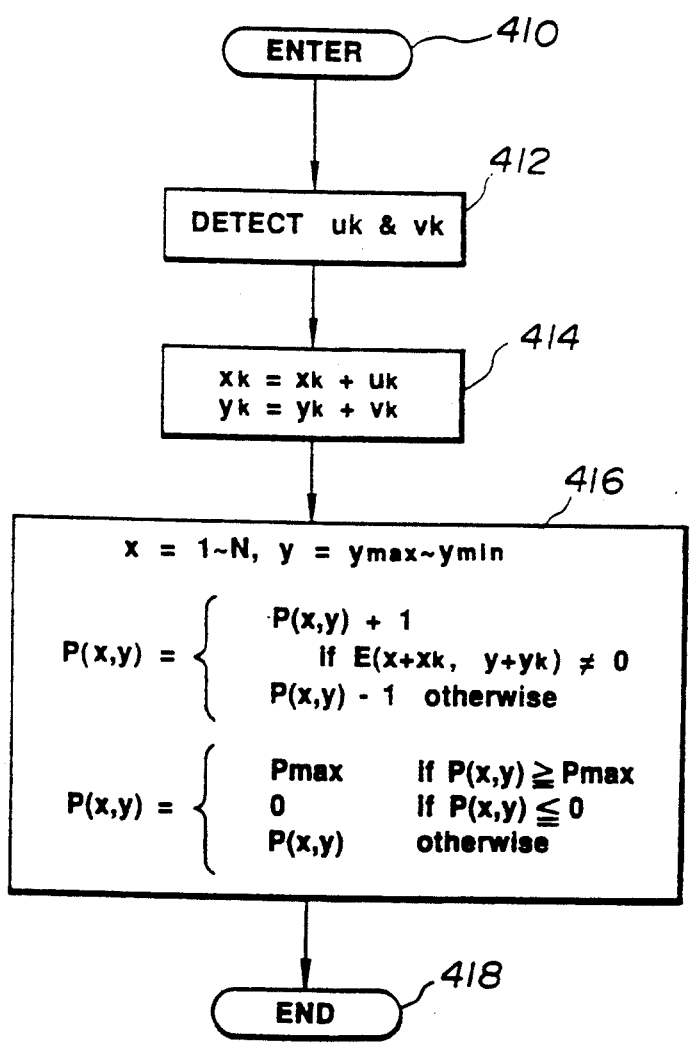
FIG. 21 is a flow diagram of the programming of the digital computer as it is used to measuring the movement of an image with respect to a reference image having no influence of movement of the television camera.

FIG. 21 is a flow diagram of the programming of the digital computer as it is used to calculate the horizontal and vertical movements xk and yk of the inputted image with respect to an image having no influence of movement of the television camera 20 and to update the array of values P(x,y).

The computer program is entered at the point 410 which corresponds to the point 314 of FIG. 16. At the point 412 in the program, the central processing unit searches a greatest one of the values R(u,v) stored in the velocity histogram and the corresponding one of the sets of velocity values u and v. The detected values u and k are set for the horizontal and vertical velocities uk and vk. At the point 414 in the program, the last horizontal and vertical movements xk and yk are updated as xk=xk+uk and yk=yk+vk. The new values xk and yk indicate the horizontal and vertical movements of the image inputted in this cycle of execution of the program with respect to an image having no influence of movement of the television camera 20.

At the point 416 in the program, values P(x,y) are updated by scanning the converted image E(x,y) over the ranges 1≦x≦M and ymin≦y≦ymax. If E(x+x-k,y+yk) is not 0, then the value P(x,y) is incremented by 1. Otherwise, the value P(x,y) is decremented by 1. The value P(x,y) is limited between a maximum value Pmax and a minimum value 0. For this purpose, the value P(x,y) is set to the maximum value Pmax if it is equal to or greater than the maximum value Pmax. The value P(x,y) is set at 0 if it is equal to or less than 0. Following this, the program proceeds to the end point 418 which corresponds to the point 316 of FIG. 16.

Each value P(x,y) indicates the number of times the corresponding pixel A(x+xk,y+yk) has been an edge point. The value P(x,y) is decremented by 1 rather than reset to 0 when the corresponding pixel is not an edge point. Thus, the value P(x,y) has a great value for a broken line such as a center line. It is to be noted that the value P(x,y) may be incremented by 2 or 3 when the corresponding pixel A(x+xk,y+yk) is an edge point. The use of the array of values P(x,y) is effective to minimize errors produced in measuring the horizontal and vertical velocities uk and vk. For example, if the velocity measuring operation is made only for two successive inputted images, an error is accumulated in the vertical and horizontal movements xk and yk since the assumed horizontal and vertical velocities uk and vk are integers. In this embodiment, the horizontal and vertical movements xk and yk can be measured without the danger of accumulating errors.

In addition, the gradient/distance histogram S is produced separately from the velocity histogram R. This is effective to reduce the number of times the program is returned for each edge point and thus reduce the time required to produce the velocity histogram R as compared to the program of FIGS. 12.1 and 12.2.

Figure 22:
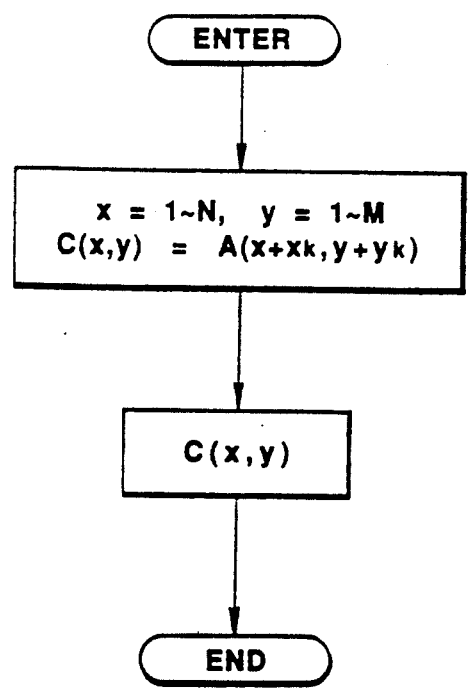
FIG. 22 is a flow diagram of the programming of the digital computer as it is used to correct the inputted image to cancel the influence of the television camera.

FIG. 22 is a flow diagram of the programming of the digital computer as it is used to correct the inputted image to cancel the influence of movement of the television camera 20. The inputted image A is converted or corrected into an image C in such a manner that each pixel A(x+xk,y+yk) is stored at address C(x,y). In this manner, the inputted image A is shifted an amount xk in the x direction and an amount yk in the y direction. The corrected image is displayed on the CRT 24.

Figure 23:
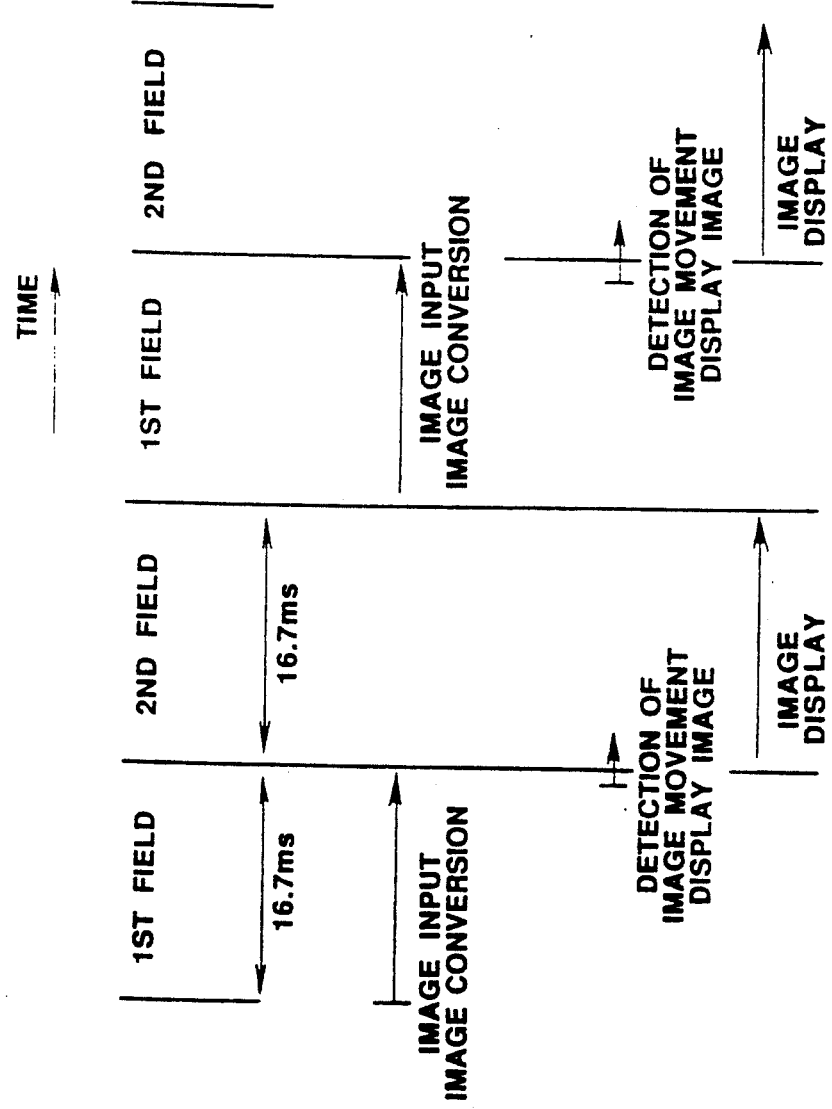
FIG. 23 is a timing chart used in explaining the image correcting operation.

The inputted image correcting operation will be described further in connection with FIG. 23. In a time duration (for example, 16.7 ms) during which the first field of an image is inputted, the inputted image A is converted into an image B. The inputted and converted images A and B are stored in different image memory sections. During the vertical retrace line interval, the movement of the inputted image A with respect to an image having no influence of movement of the television camera 10 is detected. In a time duration (for example 16.7 ms) during which the second field of the image is inputted, the inputted image is corrected based upon the detected movement by shifting each pixel A(x+x-k,y+yk) stored at an address (x+xk,y+yk) to an address (x,y). The corrected image is displayed on the CRT 24.

As apparent from the foregoing, the inputted image is shifted downward when the road ascends in front of a vehicle and is shifted upward when the road descends in front of the vehicle. This is effective to display a desired image before the vehicle starts ascending or descending.

The calculated horizontal and vertical image movements correspond to the yawing and pitching angles of a moving object, respectively, when the television camera 20 is fixed to the moving object. Thus, the horizontal and vertical image movements xk and yk can be used to control the posture of the moving object.

In addition, the calculated horizontal and vertical movements xk and yk may be utilized in the vehicle path detecting unit 26 to cancel the influence of movement of the television camera 20 from road shape measurements.

Although description has been made to measure the horizontal and vertical movements xk and yk of the inputted image, it is to be understood that this embodiment is equally applicable to measure a vertical movement yk only. In this case, the image processing unit 22 assumes a predetermined number of distance values v for a vertical distance vk between pixels representing a point in last and new images inputted successively, stores an array of values each P(x,y) of which is incremented when the corresponding pixel A(x,y+yk) is an edge point where ky is a vertical movement of the last image with respect to a reference image having no influence of movement of the television camera, assumes a predetermined number of distance values yp for a vertical distance ys, produces a gradient/velocity histogram storing an array of values each S(r,s) of which being stored in connection with a gradient value r and a distance value s, the each value S(r,s) being incremented with the corresponding gradient value r being set at α(x,y+yk)·G where G is a constant and the corresponding distance value s being set at a distance value yp assumed for the vertical distance ys when the value P(x,y−yp) for a pixel spaced a vertical distance ys equal to the assumed value yp away from each A(x,y+yk) of the edge points is greater than a predetermined value, produces a velocity histogram storing an array of values each R(v) of which is incremented by $$\sum_r S(r, v)$$

detects a greatest one of the values stored in the second histogram and the corresponding one of the distance values v, sets the detected distance value v for the vertical distance vk, and calculates a total vertical movement of the new image with respect to the reference image as yk+vk.

What is claimed is:

1. In an imaging system including a television camera, the improvement comprising:
    movement detecting apparatus used with the television camera,
    said movement detecting apparatus including:
    means for inputting electrical signals representing an input image from the television camera at intervals of time;
    edge detecting means for scanning the inputted image represented by the electrical signals in a series of scan lines to detect, in each of the scan lines, a pixel forming an edge point in the image;
    distance determining means for determining a distance between detected pixels forming the same edge point in new and previous images inputted successively from the television camera;
    movement determining means for determining a movement of the new image inputted from the television camera with respect to the previous image inputted from the television camera, based on the determined distances between pixels; and
    means for determining a total movement of the new image inputted from the television camera with respect to a reference image having no influence of movement of the television camera by adding the determined movement to a movement of the previous image with respect to the reference image.

2. An improved imaging system as claimed in claim 1, further comprising movement cancelling means for cancelling influence of movement of the television camera from an image inputted from the television camera, said movement cancelling means comprising image correcting means for generating display signals representing a correction of the new image inputted from the television camera based upon the total movement determined by said movement detecting apparatus, thereby cancelling from the inputted image the influence of movement of the television camera.

3. An improved imaging system as claimed in claim 1 wherein the television camera is fixed to a moving object, and further comprising object movement detecting means for detecting a movement of the moving object having the television camera fixed thereto based upon the total movement determined by said movement detecting apparatus.

4. An improved imaging system as claimed in claim 3 further comprising means for correcting a posture of the moving object based upon the detected movement of the moving object.

5. In an imaging system including a television camera, the improvement comprising:
    vertical movement detecting apparatus used with the television camera,
    said vertical movement detecting apparatus including:
    means for inputting an image from the television camera at intervals of time;
    edge detecting means for scanning the inputted image in a series of vertical scan lines to detect, in each of the vertical scan lines, a pixel forming an edge point in the image;
    vertical distance determining means for determining a vertical distance between first and second pixels, detected in one of the vertical scan lines, forming the same edge point in new and last images inputted successively from the television camera;
    vertical movement determining means for determining a vertical movement of the new image inputted from the television camera with respect to the last image inputted from the television camera, based on the determined vertical distances between pixels; and
    means for determining a total vertical movement of the new image inputted from the television camera with respect to a reference image having no influence of movement of the television camera by adding the determined vertical movement to a vertical movement of the last image with respect to the reference image.

6. An improved imaging system as claimed in claim 5, further comprising vertical movement cancelling means for cancelling influence of vertical movement of the television camera from an image inputted from the television camera,
    said vertical movement cancelling means comprising image correcting means for correcting the new image inputted from the television camera based upon the total vertical movement determined by said vertical movement detecting apparatus thereby to cancel from the inputted image the influence of vertical movement of the television camera.

7. An improved imaging system as claimed in claim 5 wherein the television camera is fixed to a moving object, and further comprising object movement detecting means for detecting a vertical movement of the moving object having the television camera fixed thereto based upon the total vertical movement determined by said vertical movement detecting apparatus.

8. An improved imaging system as claimed in claim 7 further comprising means for correcting a vertical posture of the moving object based upon the detected vertical movement of the moving object.

9. In an imaging system including a television camera, the improvement comprising:
   horizontal movement detecting apparatus used with the television camera,
   said horizontal movement detecting apparatus including:
   means for inputting an image from the television camera at intervals of time;
   edge detecting means for scanning the inputted image in a series of horizontal scan lines to detect, in each of the horizontal scan lines, a pixel forming an edge point in the image;
   horizontal distance determining means for determining a horizontal distance between first and second pixels, detected in one of the horizontal scan lines, forming the same edge point in new and last images inputted successively from the television camera;
   horizontal movement determining means for determining a horizontal movement of the new image inputted from the television camera with respect to the last image inputted from the television camera, based on the determined horizontal distances between pixels; and
   means for determining a total horizontal movement of the new image inputted from the television camera with respect to a reference image having no influence of movement of the television camera by adding the determined horizontal movement to a horizontal movement of the last image with respect to the reference image.

10. An improved imaging system as claimed in claim 9, further comprising horizontal movement cancelling means for cancelling influence of horizontal movement of the television camera from an image inputted from the television camera,
   said horizontal movement cancelling means comprising image correcting means for correcting the new image inputted from the television camera based upon the total horizontal movement determined by said horizontal movement detecting apparatus thereby to cancel from the inputted image the influence of horizontal movement of the television camera.

11. An improved imaging system as claimed in claim 9 wherein the television camera is fixed to a moving object, and further comprising object movement detecting means for detecting a horizontal movement of the moving object having the television camera fixed thereto based upon the total horizontal movement determined by said horizontal movement detecting apparatus.

12. An improved imaging system as claimed in claim 11 further comprising means for correcting a horizontal posture of the moving object based upon the detected horizontal movement of the moving object.

13. In an imaging system including a television camera, the improvement comprising:
   movement detecting apparatus used with the television camera,
   said movement detecting apparatus including:
   means for inputting an image from the television camera at intervals of time, the inputted image being represented by an array of pixels with each pixel $A(x,y)$ having a value indicating an intensity level thereof;
   means for converting the inputted image into an edge point image, the converted edge point image being represented by an array of values $E(x,y)$ each of which has a value of 0 or 1 indicating that the corresponding pixel $A(x,y)$ is an edge point forming an edge in the inputted image and a value indicating a gradient of the edge at the edge point;
   means for assuming a predetermined number of sets of distance values u and v for horizontal and vertical distances uk and vk between pixels representing a point in last and new images inputted successively from the television camera;
   a memory for storing an array of values $P(x,y)$ each of which is incremented when the corresponding pixel $A(x+xk, y+yk)$ is an edge point where xk and yk are horizontal and vertical movements of the last image with respect to a reference image having no influence of movement of the television camera;
   means for producing a histogram storing an array of values $R(u,v)$ each of which is incremented when the value $P(x,y-ys)$ for a pixel spaced a vertical distance ys away from each of the edge points $A(x+xk, y+yk)$ is greater than a predetermined value for the corresponding one of the sets of distance values u and v, the vertical distance ys being calculated as $ys = a.u + v$ where $a$ is the gradient of the edge at the edge point $E(x+xk, y+yk)$;
   means for detecting a greatest one of the values stored in the histogram and the corresponding one of the sets of distance values u and v;
   means for setting the detected distance values u and v for the horizontal and vertical distances uk and vk; and
   means for determining a total horizontal and vertical movement of the new image inputted from the television camera with respect to the reference image by adding the horizontal and vertical movements of the last image, xk and yk, to the horizontal and vertical distances between pixels in the last and new images, uk and vk, respectively.

14. The improved imaging system as claimed in claim 13, further including incrementing means for incrementing each value $P(x,y)$ by 1 when the corresponding pixel $A(x+xk, y+yk)$ is an edge point, and means for decrementing each value $P(x,y)$ by 1 when the corresponding pixel $A(x+xk, y+ky)$ is not an edge point,
   said incrementing means connected to said memory.

15. The improved imaging system as claimed in claim 14, further comprising setting means for setting each value $P(x,y)$ at a maximum value when the value $P(x,y)$ is equal to or greater than the maximum value, and means for setting each value $P(x,y)$ at zero when the value $P(x,y)$ is equal to zero or less than zero, said setting means connected to said memory.

16. The improved imaging system as claimed in claim 13, further comprising movement cancelling means for cancelling influence of movement of the television camera from an image inputted from the television camera,
said movement cancelling means comprising image correcting means for correcting the new image inputted from the television camera based upon the total movement determined by said means for determining a total horizontal and vertical movement thereby to cancel from the inputted image the influence of movement of the television camera.

17. The improved imaging system as claimed in claim 13 wherein the television camera is fixed to a moving object, and further comprising object movement detecting means for detecting a movement of the moving object having the television camera fixed thereto based upon the total movement determined by said movement detecting apparatus.

18. An improved imaging system as claimed in claim 17 further comprising means for correcting a posture of the moving object based upon the detected movement of the moving object.

19. In an imaging system including a television camera, the improvement comprising:
movement detecting apparatus used with the television camera,
said movement detecting apparatus including:
means for inputting an image from the television camera at intervals of time, the inputted image being represented by an array of pixels with each pixel A(x,y) having a value indicating an intensity level thereof;
means for converting the inputted image into an edge point image, the converted edge point image being represented by an array of values E(x,y) each of which has a value of 0 or 1 indicating that the corresponding pixel A(x,y) is an edge point forming an edge in the inputted image and a value indicating a gradient of the edge at the edge point;
means for assuming a predetermined number of distance values v for a vertical distance vk between pixels representing a point in last and new images inputted successively from the television camera;
a memory for storing an array of values P(x,y) each of which is incremented when the corresponding pixel A(x,y, y+yk) is an edge point where yk is a vertical movement of the last image with respect to a reference image having no influence of movement of the television camera;
means for producing a histogram storing an array of values R(u,v) each of which is incremented when the value P(x,y−v) for a pixel spaced a vertical distance v away from each of the edge points A(x,y+yk) is greater than a predetermined value for the corresponding one of the distance values v;
means for detecting a greatest one of the values stored in the histogram and the corresponding one of the distance values v;
means for setting the detected distance value v for the vertical distance vk; and
means for determining a total vertical movement of the new image inputted from the television camera with respect to the reference image by adding the vertical movement of the last image, yk, to the vertical distance between pixels in the last and new images, vk.

20. The improved imaging system as claimed in claim 19, further including incrementing means for incrementing each value P(x,y) by 1 when the corresponding pixel A(x,y+yk) is an edge point, and means for decrementing each value P(x,y) by 1 when the corresponding pixel A(x,y+ky) is not an edge point,
said incrementing means connected to said memory.

21. The improved imaging system as claimed in claim 20, further comprising setting means for setting each value P(x,y) at a maximum value when the value P(x,y) is equal to or greater than the maximum value, and means for setting each value P(x,y) at zero when the value P(x,y) is equal to zero or less than zero, said setting means connected to said memory.

22. The improved imaging system as claimed in claim 19, further comprising movement cancelling means for cancelling influence of movement of the television camera from an image inputted from the television camera,
said movement cancelling means comprising image correcting means for correcting the new image inputted from the television camera based upon the total movement determined by said means for determining a total horizontal and vertical movement thereby to cancel from the inputted image the influence of movement of the television camera.

23. The improved imaging system as claimed in claim 19 wherein the television camera is fixed to a moving object, and further comprising object movement detecting means for detecting a movement of the moving object having the television camera fixed thereto based upon the total movement determined by said movement detecting apparatus.

24. An improved imaging system as claimed in claim 23 further comprising means for correcting a posture of the moving object based upon the detected movement of the moving object.

25. In an imaging system including a television camera, the improvement comprising:
movement detecting apparatus used with the television camera,
said movement detecting apparatus including:
means for inputting an image from the television camera at intervals of time, the inputted image being represented by an array of pixels with each pixel A(x,y) having a value indicating an intensity level thereof;
means for converting the inputted image into an edge point image, the converted edge point image being represented by an array of values E(x,y) each of which has a value of 0 or 1 indicating that the corresponding pixel A(x,y) is an edge point forming an edge in the inputted image and a value indicating a gradient of the edge at the edge point;
means for assuming a predetermined number of sets of distance values u and v for horizontal and vertical distances uk and vk between pixels representing a point in last and new images inputted successively from the television camera;
a memory for storing an array of values P(x,y) each of which is incremented when the corresponding pixel A(x+xk, y+yk) is an edge point where xk and yk are horizontal and vertical movements of the last image with respect to a reference image having no influence of movement of the television camera;
means for assuming a predetermined number of distance values yp for a vertical distance ys;
first histogram means for producing a first histogram, said first histogram means storing an array of values S(r,s) each of which being stored in connection with a gradient value r and a distance value s, each value S(r,s) being incremented with the corresponding gradient value r being set at a(x+xk, y+yk) G where G is a constant and the corresponding distance value s being set at a distance value yp assumed for the vertical distance ys when the value P(x,y−yp) for a pixel spaced a vertical distance ys equal to the assumed value yp away from each a(x+xk, y+yk) of the edge points is greater than a predetermined value;

second histogram means for producing a second histogram, said second histogram means storing an array of values R(u,v) each of which is incremented by $$\sum_r S(r, u.r/G + v)$$

$$\sum_r S(r, u \cdot r/G + v)$$

means for detecting a greatest one of the values stored in the second histogram and the corresponding one of the sets of distance values u and v;

means for setting the detected distance values u and v for the horizontal and vertical distances uk and vk; and means for determining a total horizontal and vertical movement of the new image inputted from the television camera with respect to the reference image by adding the horizontal and vertical movements of the last image, xk and yk, to the horizontal and vertical distances between pixels in the last and new images, uk and vk, respectively.

26. The improved imaging system as claimed in claim 25, further including incrementing means for incrementing each value P(x,y) by 1 when the corresponding pixel A(x+xk, y+yk) is an edge point, and means for decrementing each value P(x,y) by 1 when the corresponding pixel A(x+xk, y+ky) is not an edge point, said incrementing means connected to said memory.

27. The improved imaging system as claimed in claim 26, further comprising setting means for setting each value P(x,y) at a maximum value when the value P(x,y) is equal to or greater than the maximum value, and means for setting each value P(x,y) at zero when the value P(x,y) is equal to zero or less than zero, said setting means connected to said memory.

28. The improved imaging system as claimed in claim 25, further comprising movement cancelling means for cancelling influence of movement of the television camera from an image inputted from the television camera, said movement cancelling means comprising image correcting means for correcting the new image inputted from the television camera based upon the total movement determined by said means for determining a total horizontal and vertical movement thereby to cancel from the inputted image the influence of movement of the television camera.

29. The improved imaging system as claimed in claim 25 wherein the television camera is fixed to a moving object, and further comprising object movement detecting means for detecting a movement of the moving object having the television camera fixed thereto based upon the total movement determined by said movement detecting apparatus.

30. An improved imaging system as claimed in claim 29 further comprising means for correcting a posture of the moving object based upon the detected movement of the moving object.

31. In an imaging system including a television camera, the improvement comprising:
movement detecting apparatus used with the television camera,
said movement detecting apparatus including:
means for inputting an image from the television camera at intervals of time, the inputted image being represented by an array of pixels with each pixel A(x,y) having a value indicating an intensity level thereof;
means for converting the inputted image into an edge point image, the converted edge point image being represented by an array of values E(x,y) each of which has a value of 0 or 1 indicating that the corresponding pixel A(x,y) is an edge point forming an edge in the inputted image and a value indicating a gradient of the edge at the edge point;
means for assuming a predetermined number of distance values v for a vertical distance vk between pixels representing a point in last and new images inputted successively from the television camera;
a memory for storing an array of values P(x,y) each of which is incremented when the corresponding pixel A(x,y+yk) is an edge point where yk is a vertical movement of the last image with respect to a reference image having no influence of movement of the television camera;
means for assuming a predetermined number of distance values yp for a vertical distance ys;
first histogram means for producing a first histogram, said first histogram means storing an array of values S(r,s) each of which being stored in connection with a gradient value r and a distance value s, each value S(r,s) being incremented with the corresponding gradient value r being set at a(x,y+yk) G where G is a constant and the corresponding distance value s being set at a distance value yp assumed for the vertical distance ys when the value P(x,y−yp) for a pixel spaced a vertical distance ys equal to the assumed value yp away from each a(x,y+yk) of the edge points is greater than a predetermined value;
second histogram means for producing a second histogram, said second histogram means storing an array of values R(v) each of which is incremented by $$\sum_r S(r, v)$$

means for detecting a greatest one of the values stored in the second histogram means and the corresponding one of the distance values v;
means for setting the detected distance value v for the vertical distance vk; and
means for determining a total vertical movement of the new image inputted from the television camera with respect to the reference image by adding the vertical movement of the last image, yk, to the vertical distance between pixels in the last and new images, vk.

32. The improved imaging system as claimed in claim 31, further including incrementing means for incrementing each value P(x,y) by 1 when the corresponding pixel A(x,y+yk) is an edge point, and means for decrementing each value P(x,y) by 1 when the corresponding pixel A(x,y+ky) is not an edge point,
said incrementing means connected to said memory.

33. The improved imaging system as claimed in claim 32, further comprising setting means for setting each value P(x,y) at a maximum value when the value P(x,y) is equal to or greater than the maximum value, and means for setting each value (P(x,y) at zero when the value P(x,y) is equal to zero or less than zero, said setting means connected to said memory.

34. The improved imaging system as claimed in claim 31, further comprising movement cancelling means for cancelling influence of movement of the television camera from an image inputted from the television camera,
said movement cancelling means comprising image correcting means for correcting the new image inputted from the television camera based upon the total movement determined by said means for determining a total horizontal and vertical movement thereby to cancel from the inputted image the influence of movement of the television camera.

35. The improved imaging system as claimed in claim 31 wherein the television camera is fixed to a moving object, and further comprising object movement detecting means for detecting a movement of the moving object having the television camera fixed thereto based upon the total movement determined by said movement detecting apparatus.

36. An improved imaging system as claimed in claim 35 further comprising means for correcting a posture of the moving object based upon the detected movement of the moving object.

37. In an imaging system including a television camera, the improvement comprising a movement cancelling apparatus for correcting an image inputted from the television camera to cancel an influence of movement of the television camera on the image, said movement cancelling apparatus including:
a movement detecting means used with the television camera, and
an image correcting means connected to said movement detecting means,
said movement detecting means including:
means for inputting an image from the television camera at intervals of time;
edge detecting means for scanning the inputted image in a series of scan lines to detect, in each of the scan lines, a pixel forming an edge point in the image;
distance determining means for determining a distance between detected pixels forming the same edge point in new and last images inputted successively from the television camera;
movement determining means for determining a movement of the new image inputted from the television camera with respect to the last image inputted from the television camera, based on the determined distances between pixels; and
means for determining a total movement of the new image inputted from the television camera with respect to a reference image having no influence of movement of the television camera by adding the determined movement to a movement of the last image with respect to the reference image,
said image correcting means operating for correcting the new image inputted from the television camera based upon the total movement determined by said movement detecting means, thereby to cancel from the inputted image the influence of movement of the television camera.

38. In an imaging system including a television camera fixed to a moving object, the improvement comprising apparatus for correcting a posture of the moving object based on an image inputted from the television camera, including:
a movement detecting means used with the television camera,
object movement detecting means for detecting a movement of the moving object based upon total movement determined by said movement detecting means, and
posture correcting means connected to said movement detecting means,
said movement detecting means including:
means for inputting an image from television camera at intervals of time;
edge detecting means for scanning the inputted image in a series of scan lines to detect, in each of the scan lines, a pixel forming an edge point in the image;
distance determining means for determining a distance between detected pixels forming the same edge point in new and last images inputted successively from the television camera;
movement determining means for determining a movement of the new image inputted from the television camera with respect to the last image inputted from the television camera, based on the determined distances between pixels; and
means for determining a total movement of the new image inputted from the television camera with respect to a reference image having no influence of movement of the television camera by adding the determined movement to a movement of the last image with respect to the reference image,
said object movement detecting means operating for detecting a movement of the moving object having the television camera fixed thereto based upon the total movement determined by said movement detecting apparatus,
said posture correcting means operating for correcting the posture of the moving object based upon the movement of the moving object determined by said object movement detecting means, thereby to correct the posture of the moving means based on detected movement of the television camera.

* * * * *